(12) United States Patent
Knight et al.

(10) Patent No.: US 7,778,750 B2
(45) Date of Patent: Aug. 17, 2010

(54) VEHICLE COMMUNICATIONS NETWORK ADAPTER

(75) Inventors: Alexander N. Knight, Columbus, IN (US); Andrew J. Pajakowski, Columbus, IN (US); Jon E. Krutulis, Greenwood, IN (US); Daniel P. Wolf, Columbus, IN (US); Michael W. Phillips, Columbus, IN (US); Joseph T. Beitzinger, Cincinnati, OH (US); Lee G. Shipman, Columbus, IN (US)

(73) Assignee: Cummins Inc., Columbus, IN (US)

( * ) Notice: Subject to any disclaimer, the term of this patent is extended or adjusted under 35 U.S.C. 154(b) by 2465 days.

(21) Appl. No.: 10/082,196

(22) Filed: Feb. 25, 2002

(65) Prior Publication Data

US 2003/0163587 A1 Aug. 28, 2003

(51) Int. Cl.
*G01M 17/00* (2006.01)
*G06F 15/16* (2006.01)

(52) U.S. Cl. .................... 701/33; 709/200; 701/29
(58) Field of Classification Search ............ 701/29, 701/33; 709/203
See application file for complete search history.

(56) References Cited

U.S. PATENT DOCUMENTS

| | | |
|---|---|---|
| 4,602,127 A | 7/1986 | Neely et al. |
| 4,962,456 A | 10/1990 | Abe et al. |
| 5,191,653 A | 3/1993 | Banks et al. |
| 5,475,818 A | 12/1995 | Molyneaux et al. |
| 5,541,840 A | 7/1996 | Gurne et al. |
| 5,555,498 A | 9/1996 | Berra et al. |
| 5,659,304 A | 8/1997 | Chakraborty |
| 5,737,711 A | 4/1998 | Abe |
| 5,916,287 A | 6/1999 | Arjomand et al. |
| 5,953,511 A | 9/1999 | Sescila, III et al. |
| 5,957,985 A | 9/1999 | Wong et al. |
| 6,009,363 A | 12/1999 | Beckert et al. |

(Continued)

FOREIGN PATENT DOCUMENTS

DE    41 10 372 A1    2/1991

(Continued)

OTHER PUBLICATIONS

Recommended Practice (RP) 1210, Version "A" Draft 7C, published by the Maintenance Council (TMC), undated.

(Continued)

*Primary Examiner*—Hussein A Elchanti
(74) *Attorney, Agent, or Firm*—Barnes & Thornburg LLP; J. Bruce Schelkopf

(57) ABSTRACT

An adapter is disclosed for allowing communications between a vehicle control computer coupled to one or more vehicle communications networks and a remote computer. The one or more vehicle communications networks may be configured for data communications in accordance with, for example, an SAE J1939 or an SAE J1587 communications protocol, or the like. The adapter includes a first interface for operatively coupling to the one or more communications networks and a second interface including a universal serial bus (USB) controller configured for operatively coupling to the remote computer. The USB controller may be coupled to the remote computer via a device port and a host port, and/or a USB on-the-go port. In any case, the vehicle control computer and remote computer communicate through the adapter via the vehicle communications network and the first and second interfaces.

95 Claims, 11 Drawing Sheets

U.S. PATENT DOCUMENTS

| | | |
|---|---|---|
| 6,023,232 A | 2/2000 | Eitzenberger |
| 6,064,299 A | 5/2000 | Lesesky et al. |
| 6,073,063 A | 6/2000 | Leong Ong et al. |
| 6,141,610 A | 10/2000 | Rothert et al. |
| 6,141,710 A | 10/2000 | Miesterfeld |
| 6,181,992 B1 * | 1/2001 | Gurne et al. ................... 701/29 |
| 6,202,008 B1 | 3/2001 | Beckert et al. |
| 6,236,909 B1 | 5/2001 | Colson et al. |
| 6,236,917 B1 | 5/2001 | Liebl et al. |
| 6,253,131 B1 | 6/2001 | Quigley et al. |
| 6,263,268 B1 | 7/2001 | Nathanson |
| 6,282,469 B1 | 8/2001 | Rogers et al. |
| 6,430,485 B1 * | 8/2002 | Hullinger ..................... 701/33 |
| 6,459,969 B1 | 10/2002 | Bates et al. |
| 6,469,621 B1 | 10/2002 | Vredevoogd et al. |
| 6,526,340 B1 | 2/2003 | Reul et al. |
| 6,671,799 B1 | 12/2003 | Parthasarathy |
| 6,718,425 B1 | 4/2004 | Pajakowski et al. |
| 6,728,603 B2 | 4/2004 | Pruzan et al. |
| 6,732,218 B2 | 5/2004 | Overtoom et al. |
| 6,832,281 B2 | 12/2004 | Jones et al. |
| 6,889,057 B2 | 5/2005 | Tordera et al. |
| 6,925,368 B2 * | 8/2005 | Funkhouser et al. .......... 701/33 |
| 6,928,348 B1 | 8/2005 | Lightner et al. |
| 6,941,203 B2 | 9/2005 | Chen |
| 7,020,546 B2 | 3/2006 | Nagai et al. |
| 7,155,321 B2 * | 12/2006 | Bromley et al. ............... 701/29 |
| 2001/0001319 A1 | 5/2001 | Beckert et al. |
| 2001/0005804 A1 | 6/2001 | Rayner |
| 2002/0070851 A1 | 6/2002 | Raichle et al. |
| 2004/0111188 A1 | 6/2004 | McClure et al. |

FOREIGN PATENT DOCUMENTS

| | | |
|---|---|---|
| DE | 196 31 050 A1 | 5/1998 |
| FR | 2 812 437 | 1/2002 |
| JP | 2001144828 A2 | 5/2001 |
| WO | WO0188347 A1 | 11/2001 |
| WO | WO0204793 A1 | 1/2002 |
| WO | WO 02/03620 A1 | 10/2002 |

OTHER PUBLICATIONS

Universal Serial Bus Specification, Revision 2.0, published by USB Implementers Forum, Apr. 27, 2000.

On-The-Go Supplement to the USB 2.0 Specification, Revision 1.0, published by USB Implementers Forum, Dec. 19, 2001.

International Preliminary Examination Report dated Oct. 20, 2005 for PCT/US03/04002 (12 sheets).

Japanese Office Action Patent Appl. No. 2003-572271 dated Jul. 2, 2008 (3 pages).

* cited by examiner

VEHICLE COMMUNICATIONS NETWORK ADAPTER

FIELD OF THE INVENTION

The present invention relates generally to computerized vehicular equipment, and more specifically to a system and method for communicating information between the vehicle communications network of a vehicle and either a universal serial bus (USB) host or a USB device. The invention is disclosed in the context of a vehicle data link adapter, but is believed to be useful in other applications as well.

BACKGROUND OF THE INVENTION

Motor vehicles include various electronic control computers mounted in the vehicle. The control computers may control various systems and/or subsystems within the vehicle. For example, a control computer may control the fuel system, the transmission, the brakes or the steering mechanism. These control computers are typically coupled to a variety of sensors and/or actuators. In commercial vehicles, control computers are often included that log data regarding usage of the vehicle, such as maximum speed, fuel usage, maximum acceleration, hours of usage, and the like. Such systems may even incorporate a Global Positioning System (GPS) receiver to log where the vehicle has traveled.

These control computers communicate with each other, and with external service equipment, via a vehicle communications network. Standards for vehicle communications network protocols have been developed and are well known in the art. For example, the Society of Automotive Engineers (SAE) has developed standards concerning the design and use of devices that transmit electronic signals and control information between vehicle components. Some of these standards are SAE J1939, SAE J1850, and SAE J1587. Other standards have been developed by other organizations, such as ISO-9141 developed by the International Standards Organization.

Service equipment has been utilized in the past to diagnose problems with control computers, download information logged by control computers, and upload information to control computers. For example, a control computer may limit the maximum speed or maximum torque of vehicle, and the maximum value may be programmable via a service tool. In some vehicles, a host of parameters, even the fuel mapping, may be modified via service equipment.

Service equipment may be generally categorized as handheld or stationary. A handheld service device is often referred to as a "service tool", and may be used for, among other things, trouble-shooting faults associated with control computers. A typical service tool includes a processing unit and a custom interface circuit to facilitate communication between the processing unit and the control computers in the vehicle. Most service tools are "custom" made, designed to interface only to the vehicles produced by a particular manufacturer, and often only to certain models produced by a particular manufacturer.

Stationary service equipment is generally used for retrieving data logs, and other more involved tasks, although for many purposes hand-held and stationary service equipment may be interchangeable. Recent designs for stationary service equipment have implemented personal computers. The current methods for coupling vehicle control computers to a personal computer (PC) require custom interface adapters which translate the protocols of the vehicle control computers (i.e., SAE J1939 and SAE J1587) into a PC communication standard, such as RS-232 (standard serial) or peripheral computer interface (PCI). These custom interface adapters typically include a PCI interface board mounted in the PC, or an external "pod" which is coupled between the vehicle control computer(s) and the PC.

Many manufacturers today market handheld computers for non-automotive applications. For example, a personal digital assistant (PDA) is a handheld, pen-based computer that combines personal information manager (PIM) functionality, such as a calendar and an address book, with computing features. Most PDAs are designed to communicate with a "host" computer, generally a personal computer (PC), via either an RS-232 serial port or a USB port.

Handheld computer systems may be used as a device for assisting in the extraction, display and upload of engine/vehicle information for transfer and analysis. One such system is described in U.S. patent application Ser. No. 09/583,892, titled "Handheld computer based system for collection, display, and analysis of engine/vehicle data", which is herein incorporated by reference.

Both PDAs and PCs often include USB ports. USB ports are much more versatile than standard serial ports for two reasons. First, standard serial ports are "point-to-point", so that only two devices may be connected via a standard serial link. By contrast, USB provides a multi-point serial link, so that multiple computers may be connected via one data link. Second, standard serial ports are much slower than USB ports. The maximum attainable speed on a standard serial port is currently 115 Kb/s. By contrast, high-speed USB is over 400 times faster, attaining transfer rates of 480 Mb/s, and full-speed USB is 100 times faster, attaining data rates of 12 Mb/s.

However, a computer attached to a multi-point USB serial link must either be configured as a "device", or a "host". Many devices may be attached to one host. However, on any one link, two hosts may not be directly connected to one another, nor may two devices be directly connected to one another. Some computers include an On-The-Go USB port, which allows them to function as a device, or a limited-function host, depending on the type of cable inserted into the port. Computers with an On-The-Go USB port may always be connected to a host (that is, function as a device), and may also be connected to a device (that is, function as a host) if the device is one which the On-The-Go USB port equipped computer is configured to support.

There also exist "Pocket PCs" with USB host capability, and PCs, PDAs, and other computerized devices with USB On-The-Go capability. Any USB computing device (PC, PDA, Pocket PC, etc.) may have any combination of USB host, device, or On-The-Go ports. Nothing in this disclosure is intended to indicate a limit in the possible USB combinations that may be included in a given type of computer.

The USB protocol is described in the "Universal Serial Bus Specification", revision 2.0, Apr. 27, 2000, in "Errata to the USB 2.0 Specification", Dec. 7, 2000, and in the "On-The-Go Supplement to the USB 2.0 Specification", Revision 1.0 Dec. 18, 2001, all three of which are hereby incorporated by reference.

It would be desirable to provide an adapter configured to convert engine/vehicle data link communications protocol to USB, so that either a PC, PDA, or any other USB enabled computer may communicate with a vehicle's control computers. However, a PC is generally configured as a host, a PDA is generally configured as a device, and still other computers are configured with On-The-Go ports.

What is needed is an adapter configured to convert engine/vehicle data link communications protocol to USB with a controller configured to allow both host and device capability, and alternatively or additionally to offer On-The-Go port capability.

SUMMARY OF THE INVENTION

According to one aspect of the invention, an adapter is provided for allowing communications between a vehicle control computer coupled to a vehicle communications network and a remote computer. The adapter comprises a first interface configured for operatively coupling to the vehicle communications network, a second interface including a universal serial bus (USB) controller having a USB device port and a USB host port, the second interface configured for operatively coupling to the remote computer via the USB device port and the USB host port. The vehicle control computer and the remote computer communicate via the vehicle communications network and the first and second interfaces.

Illustratively according to this aspect of the invention, the remote computer is a personal digital assistant having a USB device port, and the USB device port of the personal digital assistant is operatively coupled to the USB host port of the universal serial bus controller.

Further illustratively according to this aspect of the invention, the personal digital assistant comprises service tool software.

Illustratively according to this aspect of the invention, the remote computer is a personal computer having a USB host port, and the USB host port of the personal computer is operatively coupled to the USB device port of the universal serial bus controller.

Alternatively illustratively according to this aspect of the invention, the personal computer comprises vehicle diagnostic software.

Alternatively illustratively according to this aspect of the invention, the USB host port of the universal serial bus controller is configured for coupling with a plurality of remote computers, each of the plurality of remote computers having a USB device port.

Further illustratively according to this aspect of the invention, at least one of the plurality of remote computers comprises vehicle diagnostic software.

Alternatively illustratively according to this aspect of the invention, the vehicle communications network comprises a J1939 network segment, and the first interface of the adapter is operatively coupled to the J1939 network segment.

Further illustratively according to this aspect of the invention, messages communicated via the J1939 network segment are made available via the second interface.

Further illustratively according to this aspect of the invention, the remote computer is a personal digital assistant having a USB device port, the USB device port of the personal digital assistant is operatively coupled to the USB host port of the universal serial bus controller, and messages communicated via the J1939 network segment are further communicated to the personal digital assistant.

Alternatively illustratively according to this aspect of the invention, the remote computer is a personal computer having a USB host port, the USB host port of the personal computer is operatively coupled to the USB device port of the universal serial bus controller, and messages communicated via the J1939 network segment are further communicated to the personal computer.

Alternatively illustratively according to this aspect of the invention, the vehicle communications network comprises a J1587 network segment, and the first interface of the adapter is operatively coupled to the J1587 network segment.

Further illustratively according to this aspect of the invention, messages communicated via the J1587 network segment are made available via the second interface.

Further illustratively according to this aspect of the invention, the remote computer is a personal digital assistant having a USB device port, the USB device port of the personal digital assistant is operatively coupled to the USB host port of the universal serial bus controller, and messages communicated via the J1587 network segment are further communicated to the personal digital assistant.

Alternatively illustratively according to this aspect of the invention, the remote computer is a personal computer having a USB host port, the USB host port of the personal computer is operatively coupled to the USB device port of the universal serial bus controller, and messages communicated via the J1587 network segment are further communicated to the personal computer.

Alternatively illustratively according to this aspect of the invention, the adapter further comprising a third interface configured for operatively coupling to a second remote computer, the third interface comprises an RS-232 serial port.

Further illustratively according to this aspect of the invention, the second remote computer is a personal digital assistant having an RS-232 serial port, and the RS-232 serial port of the personal digital assistant is operatively coupled to the RS-232 serial port of the adapter.

Further illustratively according to this aspect of the invention, the personal digital assistant comprises service tool software.

Illustratively according to this aspect of the invention, the second remote computer is a personal computer having an RS-232 serial port, and the RS-232 serial port of the personal computer is operatively coupled to the RS-232 serial port of the adapter.

Further illustratively according to this aspect of the invention, the personal computer comprises vehicle diagnostic software.

Illustratively according to this aspect of the invention, the universal serial bus controller further comprises a USB On-The-Go port.

Alternatively illustratively according to this aspect of the invention, the remote computer is a personal digital assistant having a USB device port, and the USB device port of the personal digital assistant is operatively coupled to the USB On-The-Go port of the universal serial bus controller.

Alternatively illustratively according to this aspect of the invention, the remote computer is a personal computer having a USB host port, and the USB host port of the personal computer is operatively coupled to the USB On-The-Go port of the universal serial bus controller.

According to another aspect of the invention, an adapter is provided for allowing communications between a vehicle control computer coupled to a J1939 network of a vehicle and a remote computer. The adapter comprises a first interface configured for operatively coupling to the J1939 network, and a second interface including a universal serial bus (USB) controller having a USB device port and a USB host port, the second interface configured for operatively coupling to the remote computer via the USB device port and the USB host port. The vehicle control computer and the remote computer communicate via the J1939 network and the first and second interfaces.

Illustratively according to this aspect of the invention, the remote computer is a personal digital assistant having a USB device port, and the USB device port of the personal digital assistant is operatively coupled to the USB host port of the universal serial bus controller.

Further illustratively according to this aspect of the invention, the remote computer is a personal computer having a USB host port, and the USB host port of the personal computer is operatively coupled to the USB device port of the universal serial bus controller.

Alternatively illustratively according to this aspect of the invention, the USB host port of the universal serial bus controller is configured for coupling with a plurality of remote computers, each of the plurality of remote computers having a USB device port.

Alternatively illustratively according to this aspect of the invention, the adapter further comprising a third interface configured for operatively coupling to a computer, the third interface comprises an RS-232 serial port.

Further illustratively according to this aspect of the invention, the universal serial bus controller further comprises a USB On-The-Go port.

Further illustratively according to this aspect of the invention, the remote computer is a personal digital assistant having a USB device port, and the USB device port of the personal digital assistant is operatively coupled to the USB On-The-Go port of the universal serial bus controller.

Further illustratively according to this aspect of the invention, the remote computer is a personal computer having a USB host port, and the USB host port of the personal computer is operatively coupled to the USB On-The-Go port of the universal serial bus controller.

According to another aspect of the invention, an adapter is provided for allowing communications between a vehicle control computer coupled to a J1587 network of a vehicle and a remote computer. The adapter comprises a first interface configured for operatively coupling to the J1587 network, and a second interface including a universal serial bus (USB) controller having a USB device port and a USB host port, the second interface configured for operatively coupling to the remote computer via the USB device port and the USB host port. The vehicle control computer and the remote computer communicate via the J1587 network and the first and second interfaces.

Illustratively according to this aspect of the invention, the remote computer is a personal digital assistant having a USB device port, and the USB device port of the personal digital assistant is operatively coupled to the USB host port of the universal serial bus controller.

Further illustratively according to this aspect of the invention, the remote computer is a personal computer having a USB host port, and the USB host port of the personal computer is operatively coupled to the USB device port of the universal serial bus controller.

Alternatively illustratively according to this aspect of the invention, the USB host port of the universal serial bus controller is configured for coupling with a plurality of remote computers, each of the plurality of remote computers having a USB device port.

Alternatively illustratively according to this aspect of the invention, the adapter further comprising a third interface configured for operatively coupling to a second remote computer, the third interface comprises an RS-232 serial port.

Further illustratively according to this aspect of the invention, the universal serial bus controller further comprises a USB On-The-Go port.

Further illustratively according to this aspect of the invention, the remote computer is a personal digital assistant having a USB device port, and the USB device port of the personal digital assistant is operatively coupled to the USB On-The-Go port of the universal serial bus controller.

Alternatively illustratively according to this aspect of the invention, the remote computer is a personal computer having a USB host port, and the USB host port of the personal computer is operatively coupled to the USB On-The-Go port of the universal serial bus controller.

According to another aspect of the invention, an adapter is provided for allowing communications between control computers of a vehicle and a remote computer. The adapter comprises a first interface configured for operatively coupling to a J1939 network segment of the vehicle, a second interface configured for operatively coupling to a J1587 network segment of the vehicle, and a third interface including a universal serial bus (USB) controller having a USB device port and a USB host port. The third interface is configured for operatively coupling to the remote computer via the USB device port and the USB host port. Each control computer of the vehicle and the remote computer communicate via one of the J1939 network and the first and third interfaces, and the J1587 network and the second and third interfaces.

Illustratively according to this aspect of the invention, the remote computer is a personal digital assistant having a USB device port, and the USB device port of the personal digital assistant is operatively coupled to the USB host port of the universal serial bus controller.

Alternatively illustratively according to this aspect of the invention, the remote computer is a personal computer having a USB host port, and the USB host port of the personal computer is operatively coupled to the USB device port of the universal serial bus controller.

Alternatively illustratively according to this aspect of the invention, the USB host port of the universal serial bus controller is configured for coupling with a plurality of remote computers, each of the plurality of remote computers having a USB device port.

Alternatively illustratively according to this aspect of the invention, the universal serial bus controller further comprises a USB On-The-Go port.

Further illustratively according to this aspect of the invention, the remote computer is a personal digital assistant having a USB device port, and the USB device port of the personal digital assistant is operatively coupled to the USB On-The-Go port of the universal serial bus controller.

Further illustratively according to this aspect of the invention, the remote computer is a personal computer having a USB host port, and the USB host port of the personal computer is operatively coupled to the USB On-The-Go port of the universal serial bus controller.

According to another aspect of the invention, an adapter is provided for allowing communications between a vehicle control computer operatively coupled to a communication network of a vehicle and a remote computer. The method comprises receiving a datum via a first interface, the first interface operatively coupled to the communication network of the vehicle, transmitting the datum via a second interface, the second interface including a universal serial bus controller having a USB device port and a USB host port, the second interface is configured for operatively coupling to a computer via the USB device port and the USB host port. The first datum is transmitted by the vehicle control computer, and the first datum is received by the remote computer.

Illustratively according to this aspect of the invention, the datum is a network message, the network message comprising a destination address.

Further illustratively according to this aspect of the invention, the transmitting step comprises determining whether the network message is bound for the second interface, and transmitting the network message via a second interface only if the network message is bound for the second interface.

Further illustratively according to this aspect of the invention, determining whether the network message is bound for the second interface comprises reading the address and comparing it to an existing address.

Alternatively illustratively according to this aspect of the invention, the transmitting step comprises transmitting the network message via a second interface irrespective of the destination address of the network message.

According to another aspect of the invention, an adapter is provided for allowing communications between a vehicle control computer operatively coupled to a vehicle communications network and a remote computer. The adapter comprises a first interface configured for operatively coupling to the vehicle communications network, and a second interface including a USB On-The-Go port. The second interface is configured for operatively coupling to the remote computer via the USB On-The-Go port. The vehicle control computer and the remote computer communicate via the vehicle communications network and the first and second interfaces.

Illustratively according to this aspect of the invention, the remote computer is a personal digital assistant having a USB device port, and the USB device port of the personal digital assistant is operatively coupled to the USB On-The-Go port of the universal serial bus controller.

Further illustratively according to this aspect of the invention, the personal digital assistant comprises service tool software.

Alternatively illustratively according to this aspect of the invention, the remote computer is a personal computer having a USB host port, and the USB host port of the personal computer is operatively coupled to the USB On-The-Go port of the universal serial bus controller.

Alternatively illustratively according to this aspect of the invention, the personal computer comprises vehicle diagnostic software.

Alternatively illustratively according to this aspect of the invention, the vehicle communications network comprises a J1939 network segment, and the first interface of the adapter is operatively coupled to the J1939 network segment.

Further illustratively according to this aspect of the invention, messages communicated via the J1939 network segment are made available via the second interface.

Further illustratively according to this aspect of the invention, the remote computer is a personal digital assistant having a USB device port, the USB device port of the personal digital assistant is operatively coupled to the USB On-The-Go port of the universal serial bus controller, and messages communicated via the J1939 network segment are further communicated to the personal digital assistant.

Alternatively illustratively according to this aspect of the invention, the remote computer is a personal computer having a USB host port, the USB host port of the personal computer is operatively coupled to the USB On-The-Go port of the universal serial bus controller, and messages communicated via the J1939 network segment are further communicated to the personal computer.

Alternatively illustratively according to this aspect of the invention, the vehicle communications network comprises a J1587 network segment, and the first interface of the adapter is operatively coupled to the J1587 network segment.

Further illustratively according to this aspect of the invention, messages communicated via the J1587 network segment are made available via the second interface.

Further illustratively according to this aspect of the invention, the remote computer is a personal digital assistant having a USB device port, the USB device port of the personal digital assistant is operatively coupled to the USB On-The-Go port of the universal serial bus controller, and messages communicated via the J1587 network segment are further communicated to the personal digital assistant.

Alternatively illustratively according to this aspect of the invention, the remote computer is a personal computer having a USB host port, the USB host port of the personal computer is operatively coupled to the USB On-The-Go port of the universal serial bus controller, and messages communicated via the J1587 network segment are further communicated to the personal computer.

Alternatively illustratively according to this aspect of the invention, the adapter further comprising a third interface configured for operatively coupling to a second remote computer, the third interface comprises an RS-232 serial port.

Further illustratively according to this aspect of the invention, the second remote computer is a personal digital assistant having an RS-232 serial port, and the RS-232 serial port of the personal digital assistant is operatively coupled to the RS-232 serial port of the adapter.

Further illustratively according to this aspect of the invention, the personal digital assistant comprises service tool software.

Further illustratively according to this aspect of the invention, the second remote computer is a personal computer having an RS-232 serial port, and the RS-232 serial port of the personal computer is operatively coupled to the RS-232 serial port of the adapter.

Further illustratively according to this aspect of the invention, the personal computer comprises vehicle diagnostic software.

According to another aspect of the invention, an adapter is provided for allowing communications between control computers of a vehicle and a remote computer. The adapter comprises a first interface configured for operatively coupling to a J1939 network segment of the vehicle, a second interface configured for operatively coupling to a J1587 network segment of the vehicle, and a third interface including a USB On-The-Go port, the third interface configured for operatively coupling to the remote computer via the USB On-The-Go port. Each control computer of the vehicle and the remote computer communicate via one of the J1939 network and the first and third interfaces, and the J1587 network and the second and third interfaces.

Further illustratively according to this aspect of the invention, the remote computer is a personal digital assistant or personal computer having a USB On-The-Go port, and wherein the USB On-The-Go port of the remote computer is operatively coupled to the USB On-The-Go port of the adapter.

Further illustratively according to this aspect of the invention, the remote computer is a personal digital assistant having a USB device port, and wherein the USB device port of the personal digital assistant is operatively coupled to the USB On-The-Go port of the adapter.

Alternatively illustratively according to this aspect of the invention, the remote computer is a personal computer having a USB host port, and wherein the USB host port of the personal computer is operatively coupled to the USB On-The-Go port of the adapter.

Further illustratively according to this aspect of the invention, the remote computer comprises service tool software.

Further illustratively according to this aspect of the invention, wherein the remote computer comprises vehicle diagnostic software.

Alternatively illustratively according to this aspect of the invention, the adapter further comprising a fourth interface configured for operatively coupling to a second remote computer, wherein the fourth interface comprises an RS-232 serial port.

Further illustratively according to this aspect of the invention, the second remote computer is a personal digital assistant having an RS-232 serial port, and wherein the RS-232 serial port of the personal digital assistant is operatively coupled to the RS-232 serial port of the adapter.

Alternatively illustratively according to this aspect of the invention, wherein the second remote is a personal computer having an RS-232 serial port, and wherein the RS-232 serial port of the personal computer is operatively coupled to the RS-232 serial port of the adapter.

Alternatively illustratively according to this aspect of the invention, wherein the second remote computer comprises service tool software.

Alternatively illustratively according to this aspect of the invention, wherein the second remote computer comprises vehicle diagnostic software.

Alternatively illustratively according to this aspect of the invention, the remote computer is the second remote computer.

DETAILED DESCRIPTION OF A PREFERRED EMBODIMENT

Illustrative embodiments of an adapter for use with a vehicle communications network are herein described. It will be appreciated by those skilled in the art that the device is useful in applications and embodiments differing from the description that follows.

Figure 1A:
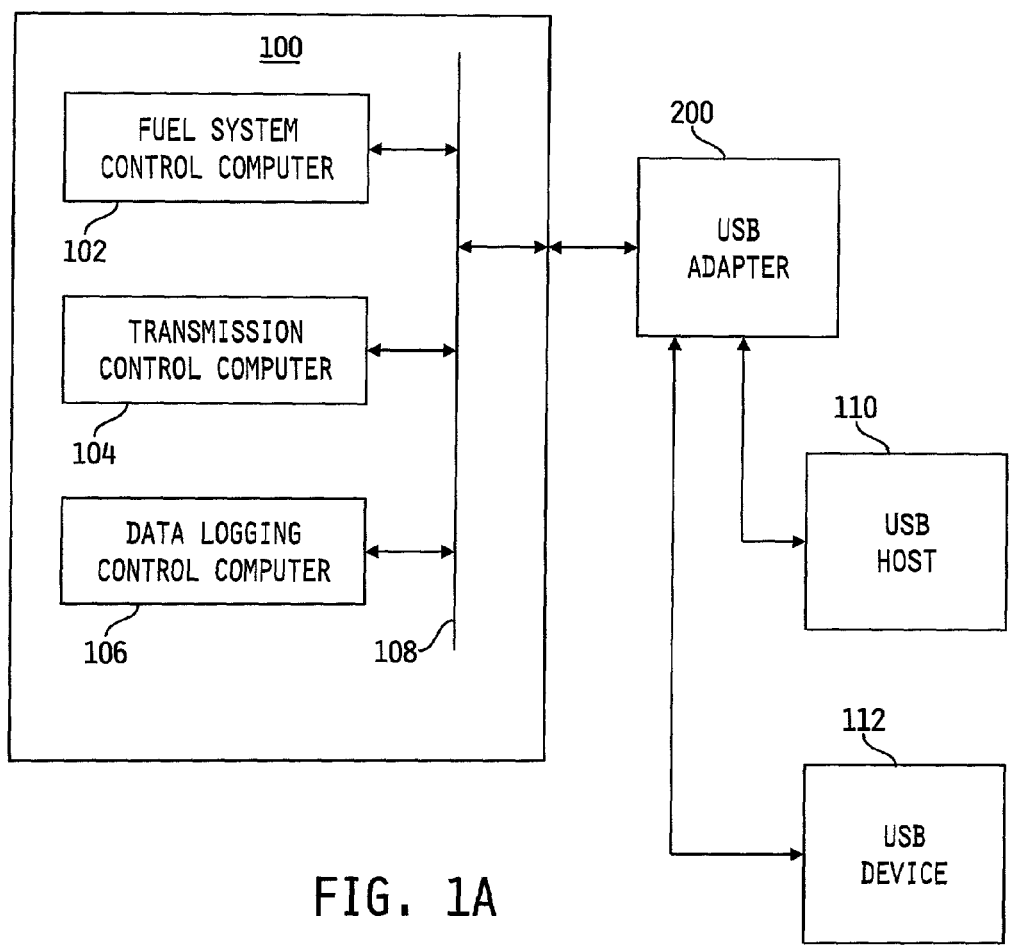
FIG. 1A is a block diagram illustrating one preferred embodiment of a vehicle communications network, in accordance with the present invention.

Referring now generally to FIG. 1A, one preferred embodiment of the present invention is shown. Vehicle control system 100 includes: fuel system control computer 102, transmission control computer 104, data logging control computer 106, and vehicle communications network 108. Those skilled in the art will recognize that vehicle control system 100 is simplified for illustration purposes, and could include a variety of other control computers, such as an automatic braking system (ABS) controller, an ignition system controller, and the like. Two items of service equipment, USB Host 110 and USB Device 112, are shown in communication with vehicle control system 100 via USB adapter 200, wherein USB adapter 200 is remotely located from vehicle control system 100.

Figure 1B:
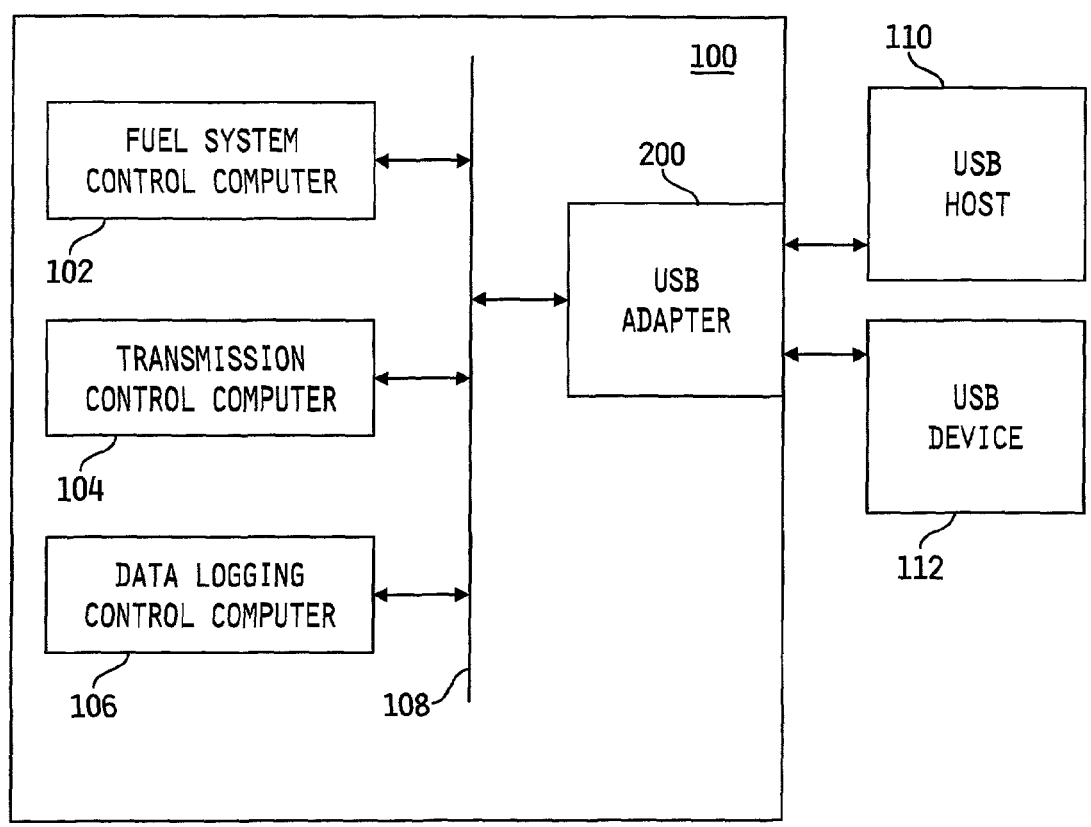
FIG. 1B is a block diagram illustrating an alternate embodiment of a vehicle communications network, in accordance with the present invention.

Referring now generally to FIG. 1B, an alternate embodiment of the present invention is shown. As shown in FIG. 1B, in this alternate embodiment vehicle control system 100 includes USB adapter 200, in addition to fuel system control computer 102, transmission control computer 104, data logging control computer 106, and vehicle communications network 108. The two items of service equipment, USB Host 110 and USB Device 112, are shown in communication with vehicle control system 100 via USB adapter 200, wherein vehicle control system 100 incorporates USB adapter 200 integrated. Those skilled in the art will understand that the functionality of USB adapter 200 is independent from the physical location thereof.

Fuel system control computer 102 (also known as an engine control computer or an engine control module) provides a fueling signal to a fuel system, which regulates the fuel and air mixture available at the intake manifold. As is known in the art, data such as a fueling map for the engine are programmed into fuel system control computer 102. Fuel system control computer 102 receives a torque request signal and various data regarding the current state of the vehicle and engine (such as engine speed and vehicle speed), and utilizes the fueling map and other stored data to calculate the fueling signal. Several elements of data are variable and may vary by application. For example, fuel system control computer 102 may contain variables for maximum engine speed and maximum vehicle speed. If a particular vehicle is, for example, a commercial truck, it may have the maximum vehicle speed variable set to 35 mph when used for local deliveries, and to 65 mph when used for long-haul deliveries. For a further example, the idle speed of the engine is often a variable, and may be adjusted according to preference.

Similarly, transmission control computer 104 provides a shift signal to an automatic transmission, which regulates the shifting of gears in the transmission. As is known in the art, data are also programmed into transmission control computer 104, and it receives various data regarding the current state of the vehicle and engine, and utilizes the stored data to calculate gear shifting. Several elements of data programmed into transmission control computer 104 are also variable, and may vary by application.

Data logging control computer 106 provides a mechanism for logging information regarding the operation of the vehicle. As is known in the art, data are also programmed into data logging control computer 106, and it receives various data regarding the current state of the vehicle, performs calculations where necessary, and stores the data. Several elements of data programmed into transmission control computer 104 are also variable, and may vary by application. For example, data logging control computer 106 may be coupled to a vehicular GPS receiver, and may log the location of the vehicle at some preprogrammed interval, such as every minute. In another example where data logging control computer 106 is coupled to a vehicular GPS receiver, it may compare the current vehicle location to a "map" containing allowable vehicle locations, and may only log "out-of-bounds" locations.

Vehicle communications network 108 is a collection of one or more computer networks that facilitate communications between network nodes. In this illustrative embodiment, fuel system control computer 102, transmission control computer 104, data logging control computer 106, and USB adapter 200 are the nodes between which data will be communicated. Because USB adapter 200 functions as a "bridge", USB device(s) 112 and USB host 110 can also be considered network nodes of vehicle communications network 108.

The Society of Automotive Engineers (SAE) Truck and Bus Control and Communications Subcommittee has developed a family of standards concerning the design and use of devices that transmit electronic signals and control information between vehicle components. One such standard, known as SAE J1939, has become an accepted industry standard in heavy-duty vehicle communications network design. Other accepted industry standards are the SAE J1587 and J1850 standards. These standards are known to those skilled in the art. In one preferred embodiment, one or more segments of vehicle communications network 108 are J1939 and/or J1587 and/or J1850 compliant. However, vehicle communications network 108 may also support other known communication protocols, such as the ISO-9141 diagnostic interface standard. Messages transmitted via vehicle communications network 108 are either "Addressed" to a specific node, or "broadcast" to one or more subnetworks. The methods of transmitting messages compliant with these protocols are well known in the art.

In one preferred embodiment, communications are carried out in accordance with Maintenance Council (TMC) established a standardized interface for vehicle computer communication and control, documented in TMC's RP1210 "Windows Communication Application Program Interface (API) Version A". This Recommended Practice (RP) defines a communication Application Program Interface (API) between the on-vehicle data link and PC application software programs running under the Windows™ family of operating systems. This RP establishes a standard interface between the physical data link (J1708, CAN/J1939, or J1850) and Windows™ software applications for the personal computer. In other preferred embodiments, other recommended practices known to those skilled in the art are implemented.

USB adapter 200 (which is described in detail, below) acts as a network bridge between vehicle communications network 108 and USB Host 110 and USB device(s) 112. A network bridge is a device that allows two networks, even ones dissimilar in topology, wiring, or communications protocols, to exchange data. The concept of a network bridge is well known in the art. USB Host 110 may be any computer having a USB host controller, such as a standard PC. USB device(s) 112 may be any computer having a USB device controller, such as a commercially available PDA, or even a broadband (cable or DSL) internet modem. Currently, up to 127 USB device(s) 112 may be connected, provided that all devices do not rely on USB adapter 200 for power, and provided that bandwidth utilization is kept below the bandwidth of the implemented USB standard.

In one preferred embodiment, USB host 110 may be stationary service equipment, such as an engine analyzer. In another preferred embodiment, USB host 110 may be a maintenance log computer that downloads log information from data logging control computer 106. Essentially, USB host 110 may be any known portable service tool, or any computer configured to interface with the nodes of a vehicle communications network.

Similarly, USB device(s) 112 may be any computer configured to interface with the nodes of a vehicle communications network, such as a PDA configured to operate as a service tool. For example, a standard PDA may contain a variety of vehicle configurations which may be downloaded to vehicle control computers. This would allow a vehicle operator to receive an updated configuration file for a vehicle via, for example, an e-mail from the vehicle manufacturer, download the configuration file to a properly configured PDA, and then carry the PDA to his vehicle to install the update. This method would be advantageous for vehicle owners that do not possess an entire "bay" of engine service equipment, as it would eliminate the need to carry a cumbersome desktop or laptop computer to the vehicle. It is generally known that USB cable runs are limited to five meters, unless a repeater is used.

Figure 2:
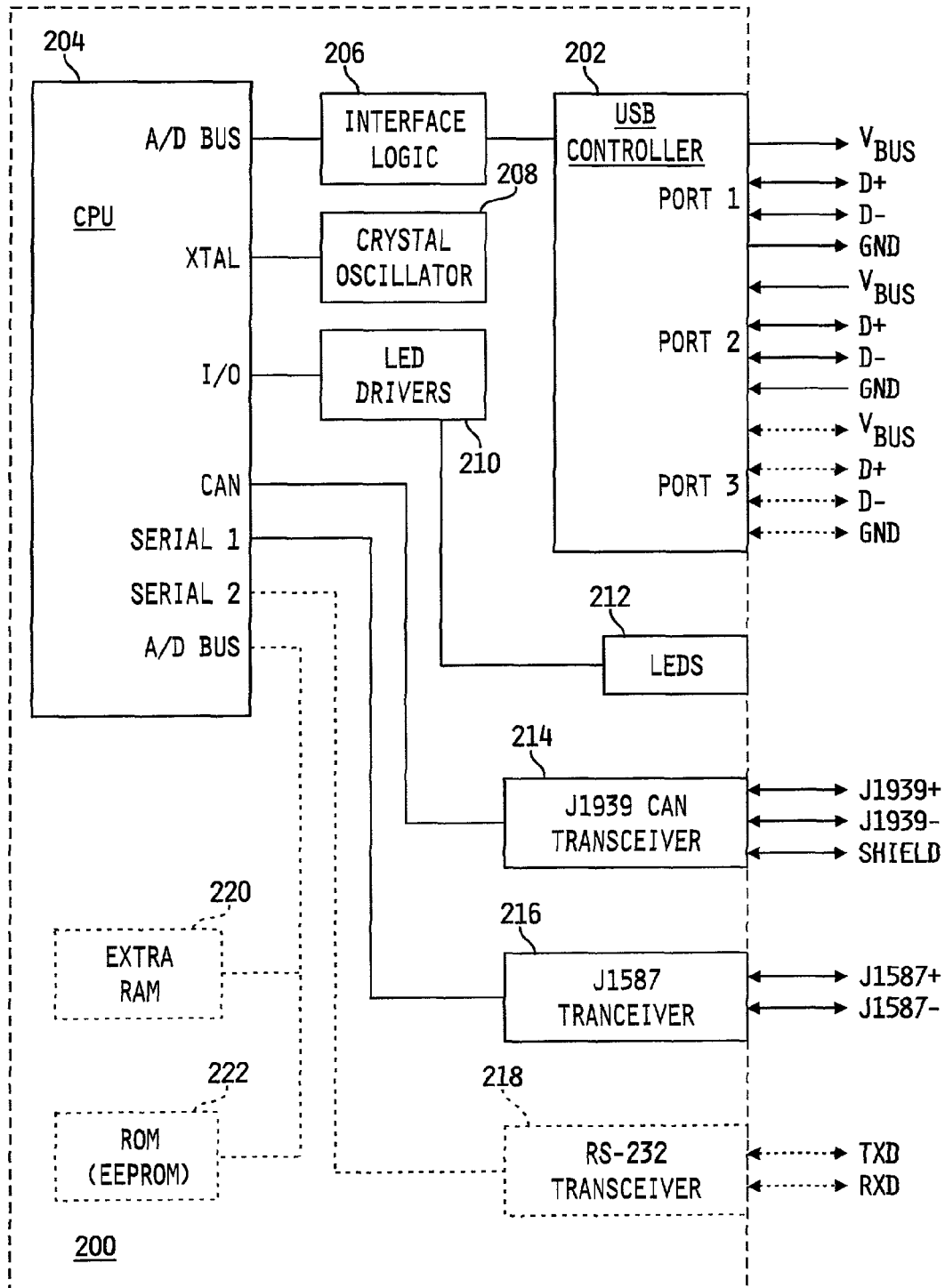
FIG. 2 is a block diagram illustrating one preferred embodiment of a vehicle communications network adapter, in accordance with the present invention.

Referring now generally to FIG. 2, one preferred embodiment of USB adapter 200 is shown. USB adapter 200 includes: USB controller 202, central processing unit (CPU) 204, interface logic 206, crystal oscillator 208, light emitting diode (LED) drivers 210, LEDs 212, J1939 transceiver 214, J1587 transceiver 216, optional RS-232 transceiver 218, optional extra random access memory (RAM) 220, optional read only memory (ROM) 222, and a power supply (not shown).

In one preferred embodiment, USB controller 202 is a commercially available USB Host/Device Controller/Transceiver circuit, such as the OTG243 single chip USB host and device controller manufactured by TransDimension, Incorporated of Irvine, Calif., or such as the ISP1362 USB host and device controller manufactured by Royal Philips Electronics of the Netherlands. However, a custom very large scale integrated (VLSI) circuit or other proprietary circuit containing separate host and device controllers could be used to fulfill this function. USB controller 202 provides the proper interface and message protocol for communicating over a Universal Serial Bus. USB controller 202 provides both a host downstream port (Port 1) and a device upstream port (Port 2). Optionally, USB controller 202 may provide an On-The-Go USB port (Port 3), which acts as either a host or a device port depending on whether a "mini-A" or a "mini-B" plug is inserted into the port's "mini-AB" receptacle. In other preferred embodiments, the USB controller is implemented as an on-board peripheral internal to CPU 240. In yet other preferred embodiments, the USB transceiver is separate from the USB controller.

An On-The-Go USB port provides full functionality as a USB device, and limited functionality as a USB host. The primary intended use for an On-The-Go USB port is to allow two similar devices, such as two PDAs, to communicate directly with each other, as well as with a host. Essentially, for this to occur, one of the "devices" in a device-to-device link must temporarily act as a host. It may be desirable in certain embodiments to implement device and host functionality with only a single On-The-Go USB port (Port 3). It will be understood by those skilled in the art that utilizing a single On-The-Go USB port may be desirable in certain embodiments, that utilizing discrete host and device ports may be desirable in certain other embodiments, and that utilizing discrete host and device ports in conjunction with an On-The-Go port may be desirable in still other embodiments. It will also be understood by those skilled in the art that none of these embodiments depart from the scope of the invention disclosed herein.

Each USB port has an appropriate USB receptacle which includes Vbus and GND connections for power, data positive (D+) and data negative (D−) connections for data, an ID connection if there is On-The-Go functionality (not shown), and a shield connection (not shown). A USB hub may be connected to either port, although a self-powered hub is recommended for the host port because of limitations regarding how much power USB controller 202 can provide. Protection circuitry is included to prevent permanent damage to adapter 200 from some external fault conditions.

In one preferred embodiment, central processing unit (CPU) 204 comprises a microcontroller. However, in other embodiments CPU 204 could comprise a digital signal processor, a microprocessor, or some other circuit capable of carrying out computations. CPU 204 executes the software stored in on-board ROM or EPROM (not shown) or in optional remotely located ROM or EPROM 222. On-board or remotely located EPROM memory 222 could be Flash EPROM, EEPROM, or UV EPROM circuits. The software provides a means for performing the adapter functions. In one preferred embodiment, CPU 204 includes on-board random access memory (RAM) for executing software, and in other preferred embodiments USB adapter 200 includes optional off-board RAM 220.

The use of Flash EPROM and EEPROM memory for the on-board EPROM of CPU 240 or for EPROM 222 allows the software to be updated via one of the communications ports of adapter 200. Illustratively, a software update would be loaded onto an external computer, and that computer would communicate the updated software to adapter 200, where CPU 204 would execute an update algorithm to load the software into the Flash EPROM and EEPROM memory In one preferred embodiment, CPU 204 comprises a crystal oscillator input (XTAL), parallel address/data bus interface (A/D Bus), controller area network (CAN) interface, two serial communications interfaces (Serial 1, Serial 2), and digital input/output interfaces (I/O). These interfaces are configured to be interoperable with other elements of USB adapter 200 as follows.

The Crystal oscillator input (XTAL) of CPU 204 interfaces with crystal oscillator 208. Crystal oscillator 208 includes either separate crystals or a complete active oscillator circuit for providing the necessary oscillator input clocks to CPU 204 and the USB Controller 202. Alternatively, crystal oscillator 208 may be any clock circuit capable of generating the appropriate waveforms, as is known in the art.

The digital input/output interfaces (I/O) of CPU 204 interface with LED drivers 210. LED drivers 210 provide the necessary power to turn on LEDs 212. LEDs 212 indicate the operational status of the adapter 200, as well as the operational status of each of the communication networks. USB controller 202 may also interface with LED drivers 210 in order to provide an indication of the status of the universal serial busses, although the LEDs and their supporting hardware may not be included in all embodiments.

Regarding LEDs 212, in one preferred embodiment, one LED indicates that power is being applied to the USB adapter 200, while others indicate the status of communications over the universal serial busses, the J1939 network, the J1587 network, and the optional Electronics Industry Association (EIA) or Recommended Standards (RS) RS-232 (also known as EIA-232) serial communication link.

The CAN interface of CPU 204 interfaces with J1939 CAN transceiver 214. Transceiver 214 provides an interface between the CAN controller in CPU 204 and the J1939 data link of vehicle communications network 108. Transceiver 214 is compatible with SAE J1939 part 11 and part 15 hardware interface schemes, which are known in the art. Transceiver 214 also includes protection circuitry that prevents permanent damage to adapter 200 caused by certain external fault conditions. In other preferred embodiments, the CAN controller is implemented as an integrated circuit (IC) distinct from CPU 204. In this embodiment, the CAN controller IC is coupled between the A/D Bus or a serial bus of CPU 204 and CAN transceiver 214. In yet another preferred embodiment, the transceiver functionality of CAN transceiver 214 is integrated with a distinct CAN controller IC, and this single IC is coupled to the A/D Bus or a serial bus of CPU 204.

A first serial communications interface (Serial 1) of CPU 204 interfaces with J1587 transceiver 216. Transceiver 216 is an RS-485 (also known as EIA-485) transceiver circuit that conforms to the SAE J1708 hardware interface standard, as is known in the art. The J1708 standard is based on the RS-485 interface standard. Because both the SAE J1587 and the SAE J1922 standards are based on the J1708 interface, both J1922 and J1587 messages can also be received and transmitted via J1587 transceiver 216.

Transceiver 216 provides the interface between a first serial communications interface (otherwise known as a universal asynchronous receiver transmitter or UART) in CPU 204 and a J1708/J1587 and/or a J1708/J1922 data link of vehicle communications network 108. Transceiver 216 also includes protection circuitry that prevents permanent damage to adapter 200 caused by certain external fault conditions. In other preferred embodiments, the UART may exist as a distinct IC outside of CPU 204, in which case the UART would be coupled between CPU 204 and J1587 transceiver 216. In yet another preferred embodiment, the transceiver functionality of J1587 transceiver 216 is integrated with a distinct UART IC, and this single IC is coupled to CPU 204.

In one preferred embodiment, a second serial communications interface (Serial 2) of CPU 204 interfaces with optional RS-232 transceiver 218. Optional RS-232 transceiver 218 provides an interface between a second serial communications interface (otherwise known as a universal asynchronous receiver transmitter or UART) in CPU 204 and a serial port of another computer system, such as a PC or PDA. Transceiver 218 also includes protection circuitry that prevents permanent damage to adapter 200 caused by certain external fault conditions. In other preferred embodiments, the UART may exist as a distinct IC outside of CPU 204, in which case the UART would be coupled between CPU 204 and RS-232 transceiver 218. In yet another preferred embodiment, the transceiver functionality of RS-232 transceiver 218 is integrated with a distinct UART IC, and this single IC is coupled to CPU 204.

In one preferred embodiment, the address/data bus interface (A/D Bus) of CPU 204 interfaces to optional ROM 222 via addressing interface logic (not shown). ROM 222 utilizes either ROM or EPROM memory for storing software, or other parameters. EPROM memory may be Flash EPROM, EEPROM, UV EPROM circuits, or any other type of erasable ROM.

In one preferred embodiment, the address/data bus interface (A/D Bus) of CPU 204 interfaces to optional extra RAM 220 via addressing interface logic (not shown). Extra RAM 220 may be used for executing software, or for storing data while power is applied.

In one preferred embodiment, the address/data bus interface (A/D Bus) of CPU 204 interfaces to interface logic 206, as necessary. Interface logic 206 provides the proper interface and timing requirements between the parallel address/data bus of CPU 204 and USB controller 202. The use of interface logic to connect devices to CPUs is known in the art. In other preferred embodiments, interface logic may not be required in an interface between the parallel address/data bus of CPU 204 and USB controller 202. In still other preferred embodiments, the interface between CPU 204 and USB controller 202 may be a serial interface, such as a Serial Peripheral Interface (SPI).

In one preferred embodiment, USB adapter 200 includes a power supply circuit (not shown) that provides the optional Flash memory programming voltage (Vpp), optional 3.3-Volt power, and 5-Volt power to all of the internal circuitry. This power supply circuit may also provide the 5-Volt power to the downstream USB Vbus in the Port 1. Furthermore, this power supply circuit may provide an optional external trickle charge voltage for charging rechargeable PDA batteries. The power supply circuit may be compatible with 12-Volt, 24-Volt, and future 42-Volt vehicle electrical systems. The power may be provided from the vehicle via a vehicle data link connector, the vehicle cigarette lighter, or some other means. An alternative source of power could come from the Vbus of a connected USB Host. USB adapter 200 may also include optional internal batteries that supply power to the Adapter, or the adapter may receive power from an external or internal AC-to-DC power supply when AC power is available. Where batteries are utilized, in one illustrative embodiment, a low-power "sleep" mode is implemented. The low-power "sleep" mode engages when no communications activity is detected for a set period of time, in order to prevent the batteries from being drained when the adapter is not in use.

Reference is now made to FIGS. 3-10, which illustrate examples of algorithms executed by USB adapter 200. The eight interfaces (J1939 to USB, USB to J1939, J1587 to USB, USB to J1587, J1939 to RS-232, RS-232 to J1939, J1587 to RS-232, and RS-232 to J1587) are discussed individually below. Those skilled in the art will recognize that the algorithms described herein are illustrative, and that other algorithms could be implemented without departing from the scope of the invention.

Figure 3:
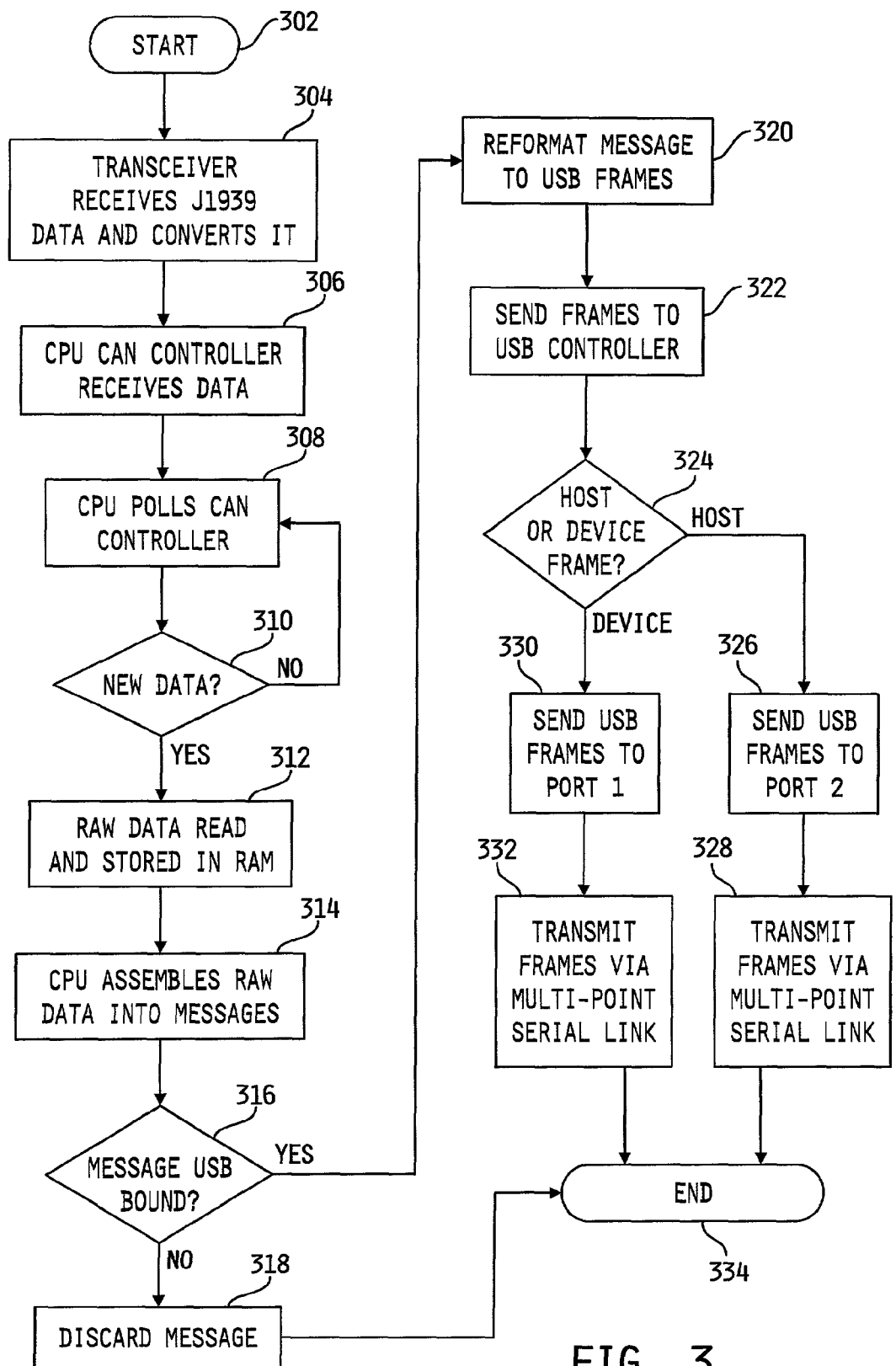
FIG. 3 is a flowchart illustrating one embodiment of an algorithm for transferring messages between a vehicle communications network and a computer, in accordance with the present invention.

Turning to FIG. 3, a flow chart that illustrates one preferred embodiment of an algorithm to implement the J1939 to USB interface is shown. The algorithm begins at step 302. In step 304, serial information from the J1939 portion of vehicle communications network 108 containing network messages first enters J1939 transceiver 214 over lines J1939+ and J1939-. Transceiver 214 converts the data signal as required for it to be read by the CAN interface of CPU 204. In step 306, the data signal is received by a CAN controller associated with the CAN interface of CPU 204. In steps 308-310, CPU 204 polls the CAN controller in a continuous polling cycle. (The complete polling cycle includes polling all other interfaces, as well.) During each cycle, in step 312 any new raw data is read and stored in a RAM associated with CPU 204. Alternatively, CPU 204 may respond to an interrupt generated when data is received by the CAN controller. Both polling software and interrupt handlers are well known in the art, and those skilled in the art will recognize that either method could be implemented without departing from the scope of the invention.

In step 314, CPU 204 assembles the raw data into messages, and in step 316 it determines if a message is bound for USB host 110 or one of USB devices 112. If the message is not bound for a USB host 110 or one of USB devices 112, then in step 318 the message is discarded. Otherwise, in step 320 CPU 204 reformats the message as one or more properly addressed USB frames.

In step 322, the USB frames are sent from the A/D bus interface of CPU 204 to USB controller 202, which communicates them to the appropriate port (Port 1 for devices, and Port 2 for a host) in steps 324 and step 326 or step 330. In step 332 or step 328, the USB frames are sent from the appropriate port of USB controller 202 via the USB serial link to USB host 110 or USB device 112, in accordance with the address of each USB frame.

Optionally, if the controller includes an On-The-Go Port 3, USB controller 202 communicates the USB frames to Port 3 where appropriate (not shown). The frames are then sent from the Port 3 of USB controller 202 via the USB serial link to USB host 110 or USB device 112, in accordance with the address of each USB frame. At step 334, the algorithm ends, and returns to "Start" step 302.

Figure 4:
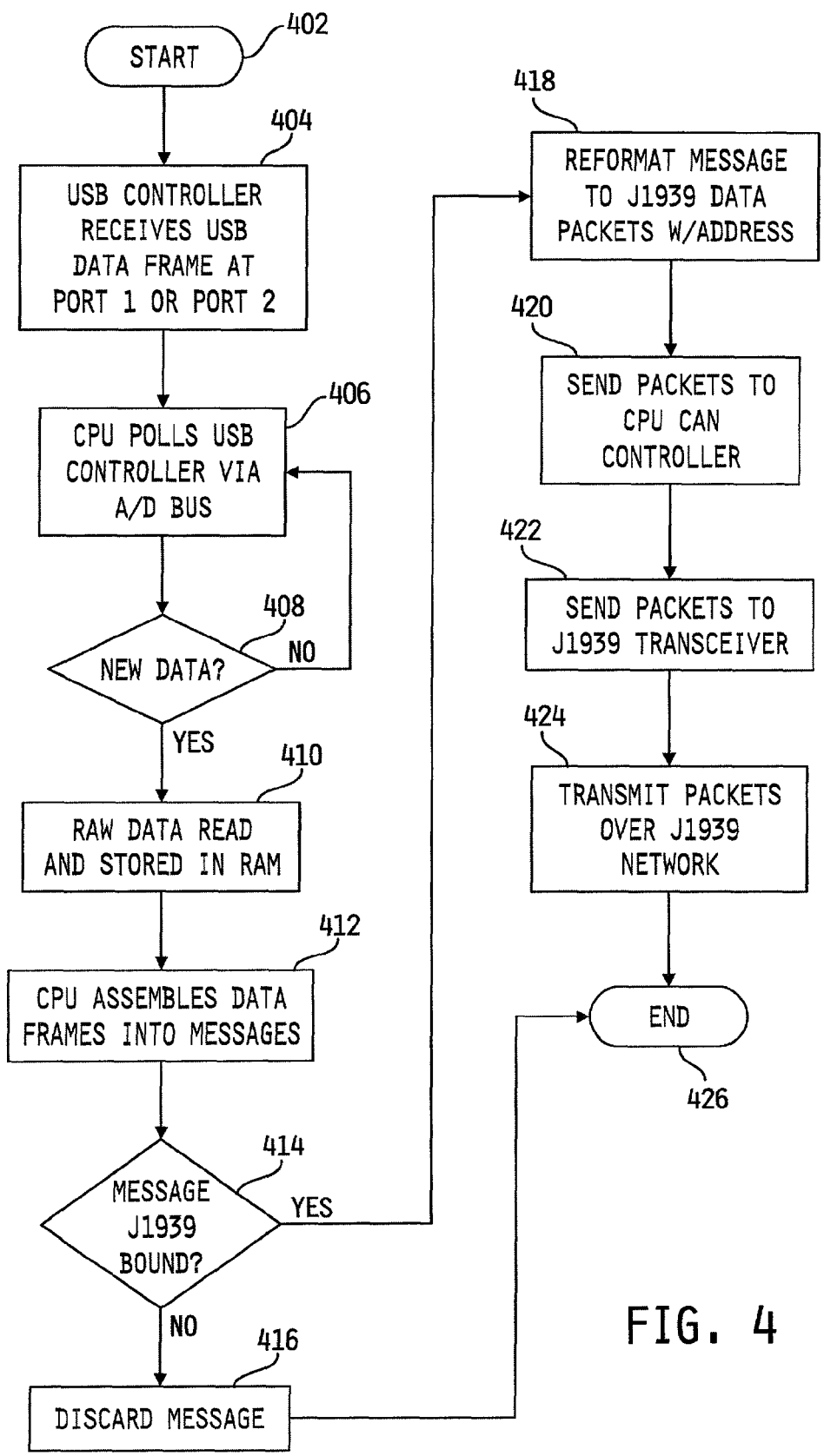
FIG. 4 is a flowchart illustrating one embodiment of an algorithm for transferring messages between a vehicle communications network and a computer, in accordance with the present invention.

Turning to FIG. 4, a flow chart that illustrates one preferred embodiment of an algorithm to implement the USB to J1939 interface is shown. The algorithm begins at step 402. In step 404, a USB data frame from the USB serial link enters either Port 1 or Port 2 of USB controller 202. Optionally, if the controller includes an On-The-Go Port 3, a USB data frame from the USB serial link may enter Port 3 of USB controller 202 (not shown). In steps 406-408, CPU 204 polls USB controller 202 in a continuous polling cycle. During each cycle, in step 410 any new data frame is read and stored in a RAM associated with CPU 204. Alternatively, CPU 204 may respond to an interrupt generated when data is received by USB controller 202.

In step 412, CPU 204 assembles the data frames into messages, and in step 414 it determines if a message is addressed to a J1939 node of vehicle communications network 108. If not, then in step 416 the message is discarded. Otherwise, in step 418 CPU 204 reformats the message as one or more properly addressed J1939 data packets. In step 420, The J1939 data packets are sent to the CAN controller of CPU 204, and in step 422 the data packets are sent to J1939 transceiver 214. In step 424, transceiver 214 communicates these data packets to the appropriate node of vehicle communications network 108 via the J1939+ and J1939- network lines coupled thereto, in accordance with the address of the data packet. At step 426, the algorithm ends, and returns to "Start" step 402.

Figure 5:
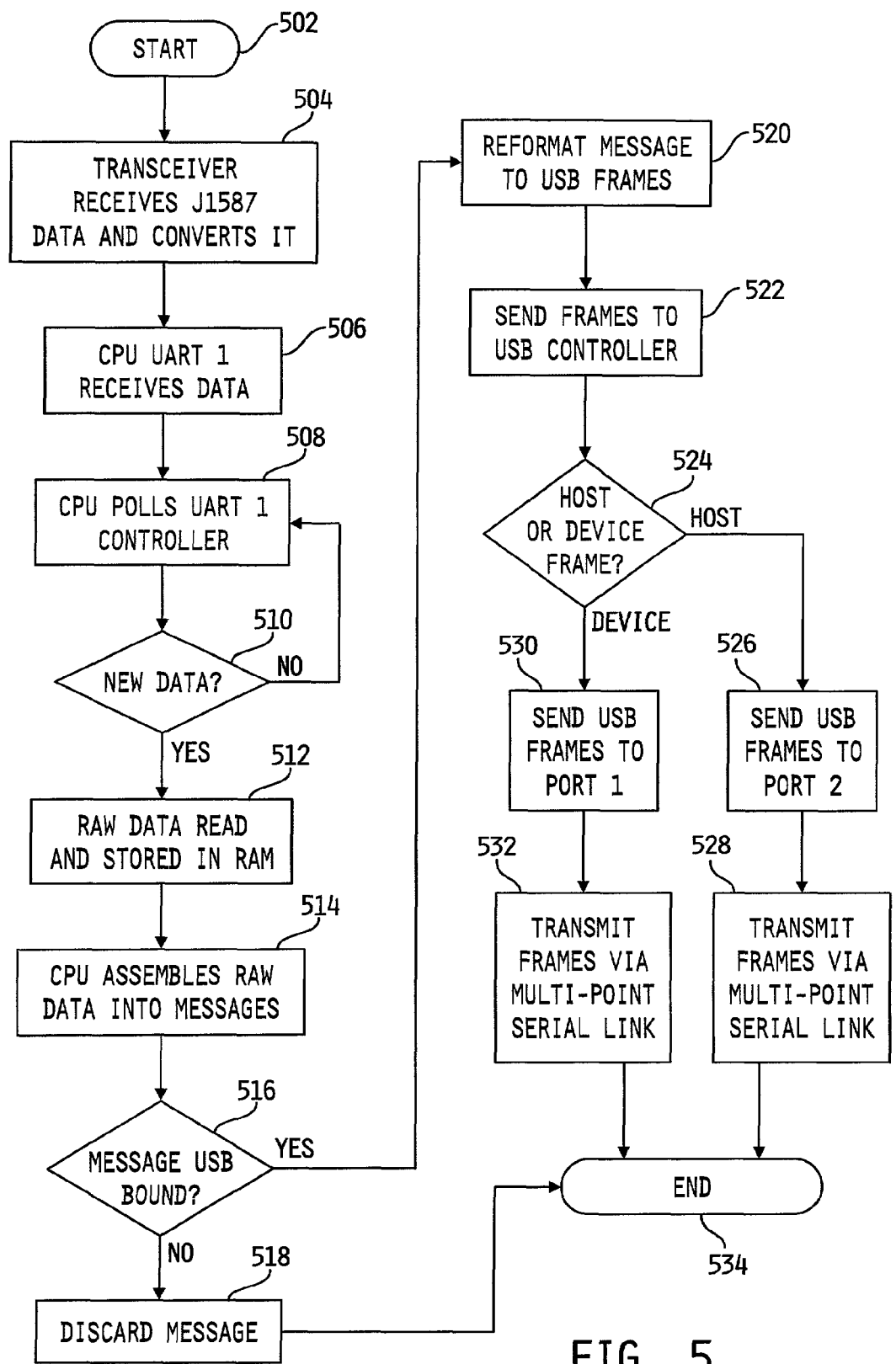
FIG. 5 is a flowchart illustrating one embodiment of an algorithm for transferring messages between a vehicle communications network and a computer, in accordance with the present invention.

Turning to FIG. 5, a flow chart that illustrates one preferred embodiment of an algorithm to implement the J1587 to USB interface is shown. The algorithm begins at step 502. In step 504, serial information from the J1587 portion of vehicle communications network 108 containing network messages first enters J1587 transceiver 216 over lines J1587+ and J1587-. Transceiver 216 converts the data signal as required for it to be read by the UART associated with the Serial 1 interface of CPU 204. In step 506, the data signal is received by the UART associated with the Serial 1 interface of CPU 204. In steps 508-510, CPU 204 polls the UART in a continuous polling cycle. During each cycle, in step 512 any new raw data is read and stored in a RAM associated with CPU 204.

Alternatively, CPU 204 may respond to an interrupt generated when data is received by the UART.

In step 514, CPU 204 assembles the raw data into messages, and in step 516 determines if a message is bound for USB host 110 or one of USB devices 112. If not, then in step 518 the message is discarded. Otherwise, in step 520 CPU 204 reformats the message as one or more properly addressed USB frames. In step 522, the USB frames are sent from the A/D bus interface of CPU 204 to USB controller 202, which communicates them to the appropriate port (Port 1 for devices, and Port 2 for a host) in steps 524 and either step 526 or step 530. In step 528 or step 532, the USB frames are sent from the appropriate port of USB controller 202, via the USB serial link, to USB host 110 or USB device 112, in accordance with the address of the USB data frame.

Optionally, if the controller includes an On-The-Go Port 3, USB controller 202 communicates the USB frames to Port 3 where appropriate (not shown). The frames are then sent from the Port 3 of USB controller 202 via the USB serial link to USB host 110 or USB device 112, in accordance with the address of each USB frame. At step 534, the algorithm ends, and returns to "Start" step 502.

Figure 6:
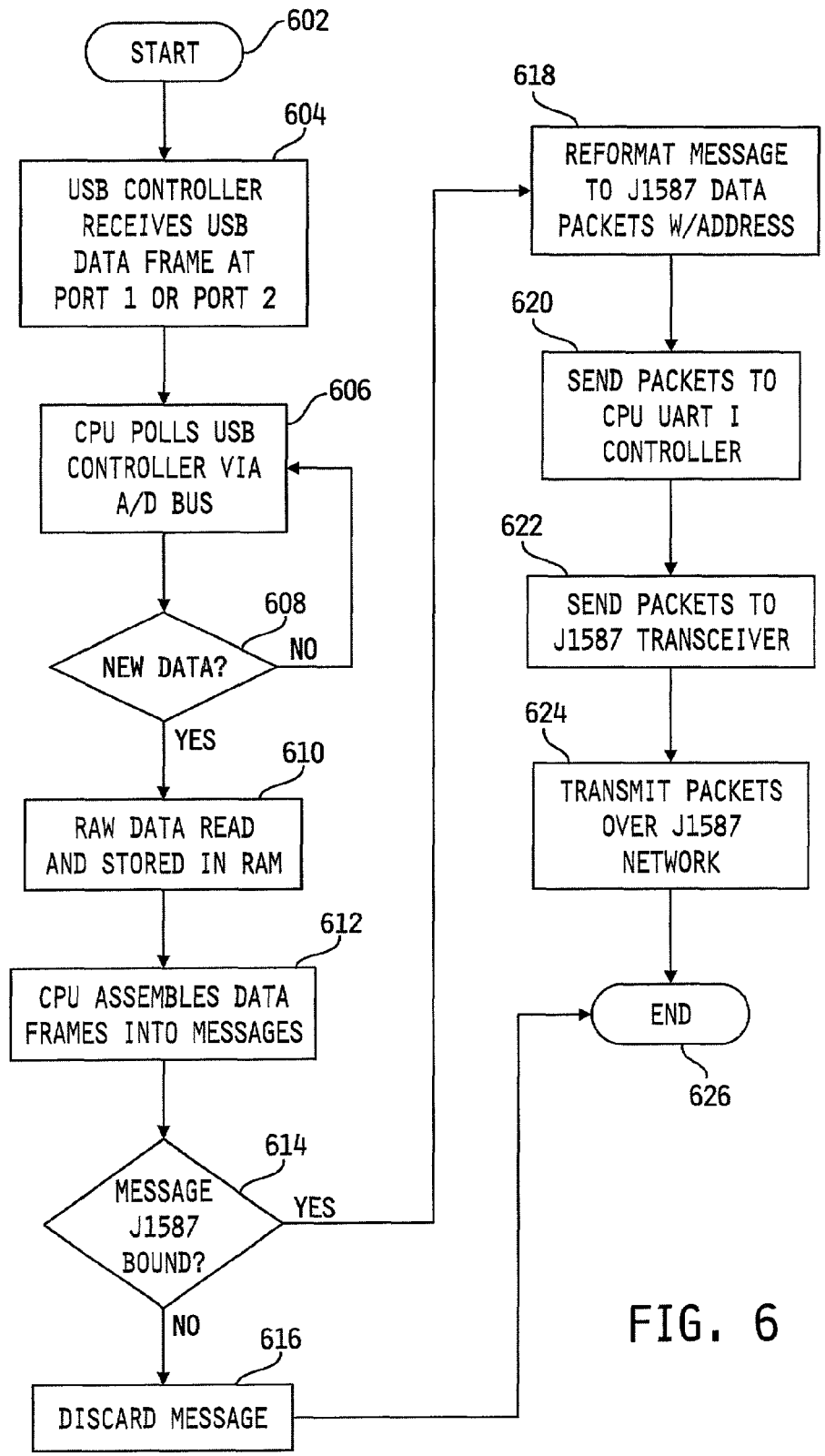
FIG. 6 is a flowchart illustrating one embodiment of an algorithm for transferring messages between a vehicle communications network and a computer, in accordance with the present invention.

Turning to FIG. 6, a flow chart that illustrates one preferred embodiment of an algorithm to implement the USB to J1587 interface is shown. The algorithm begins at step 602. In step 604, serial information from the USB serial link first enters either Port 1 or Port 2 of USB controller 202 as USB data frames. Optionally, if the controller includes an On-The-Go Port 3, a USB data frame from the USB serial link may enter Port 3 of USB controller 202 (not shown). In steps 606-608, CPU 204 polls USB controller 202 in a continuous polling cycle. During each cycle, in step 610 any new data frame is read and stored in a RAM associated with CPU 204. Alternatively, CPU 204 may respond to an interrupt generated when data is received by USB controller 202.

In step 612, CPU 204 assembles the data frames into messages, and in step 614 determines if a message is addressed to a J1587 node of vehicle communications network 108. If not, then in step 616 the message is discarded. Otherwise, in step 618 CPU 204 reformats the message as one or more properly addressed J1587 data packets. In step 620, the J1587 data packets are sent to the UART associated with the Serial 1 interface of CPU 204. In step 622, the J1587 data packets are sent to J1587 transceiver 216. In step 624, transceiver 216 communicates these data packets to the appropriate node of vehicle communications network 108 via the J1587+ and J1587− lines coupled thereto, in accordance with the address of the data packet. At step 626, the algorithm ends, and returns to "Start" step 602.

Figure 7:
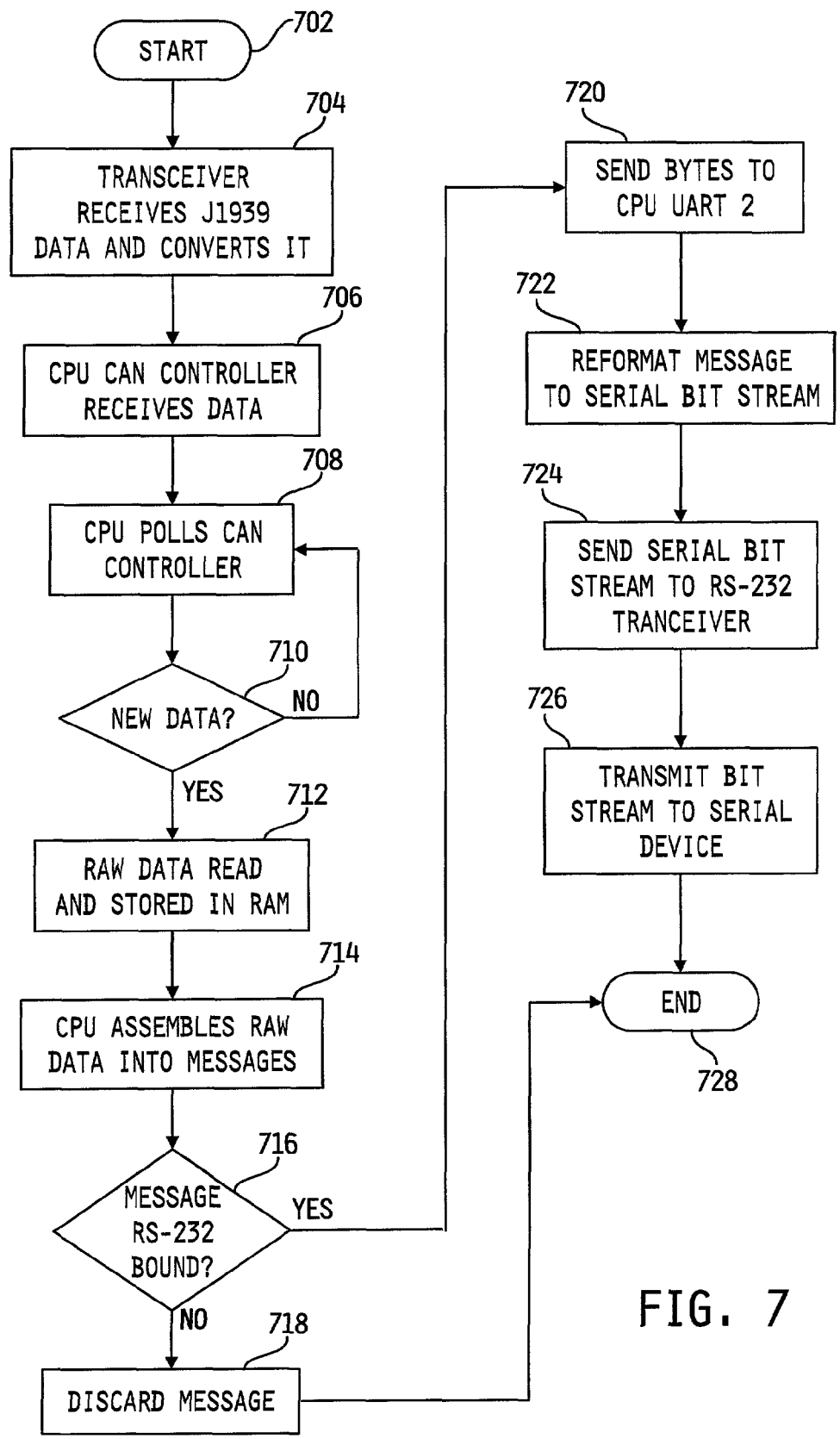
FIG. 7 is a flowchart illustrating one embodiment of an algorithm for transferring messages between a vehicle communications network and a computer, in accordance with the present invention.

Turning to FIG. 7, a flow chart that illustrates one preferred embodiment of an algorithm to implement the optional J1939 to RS-232 interface is shown. The algorithm begins at step 702. In step 704, serial information from the J1939 portion of vehicle communications network 108 containing network messages first enters J1939 transceiver 214 over lines J1939+ and J1939− thereof. Transceiver 214 converts the data signal as required for it to be read by the CAN interface of CPU 204. In step 706, the data signal is received by a CAN controller associated with the CAN interface of CPU 204. In steps 708-710, CPU 204 polls the CAN controller in a continuous polling cycle. During each cycle, in step 712 any new raw data is read and stored in a RAM associated with CPU 204. Alternatively, CPU 204 may respond to an interrupt generated when data is received by the CAN controller.

In step 714, CPU 204 assembles the raw data into messages, and in step 716 determines if a message is bound for a serial device coupled to RS-232 transceiver 218. If not, then in step 718 the message is discarded. Otherwise, in step 720 the bytes of the message are sent to the UART associated with the Serial 2 interface of CPU 204. In step 722, the UART reformats the message into a serial bit stream. In step 724, the serial bit stream is sent from the UART associated with the Serial 2 interface of CPU 204 to RS-232 transceiver 218. In step 726, RS-232 transceiver 218 transmits the serial bit stream to the serial device coupled thereto via the TXD line of transceiver 218. At step 728, the algorithm ends, and returns to "Start" step 702.

Figure 8:
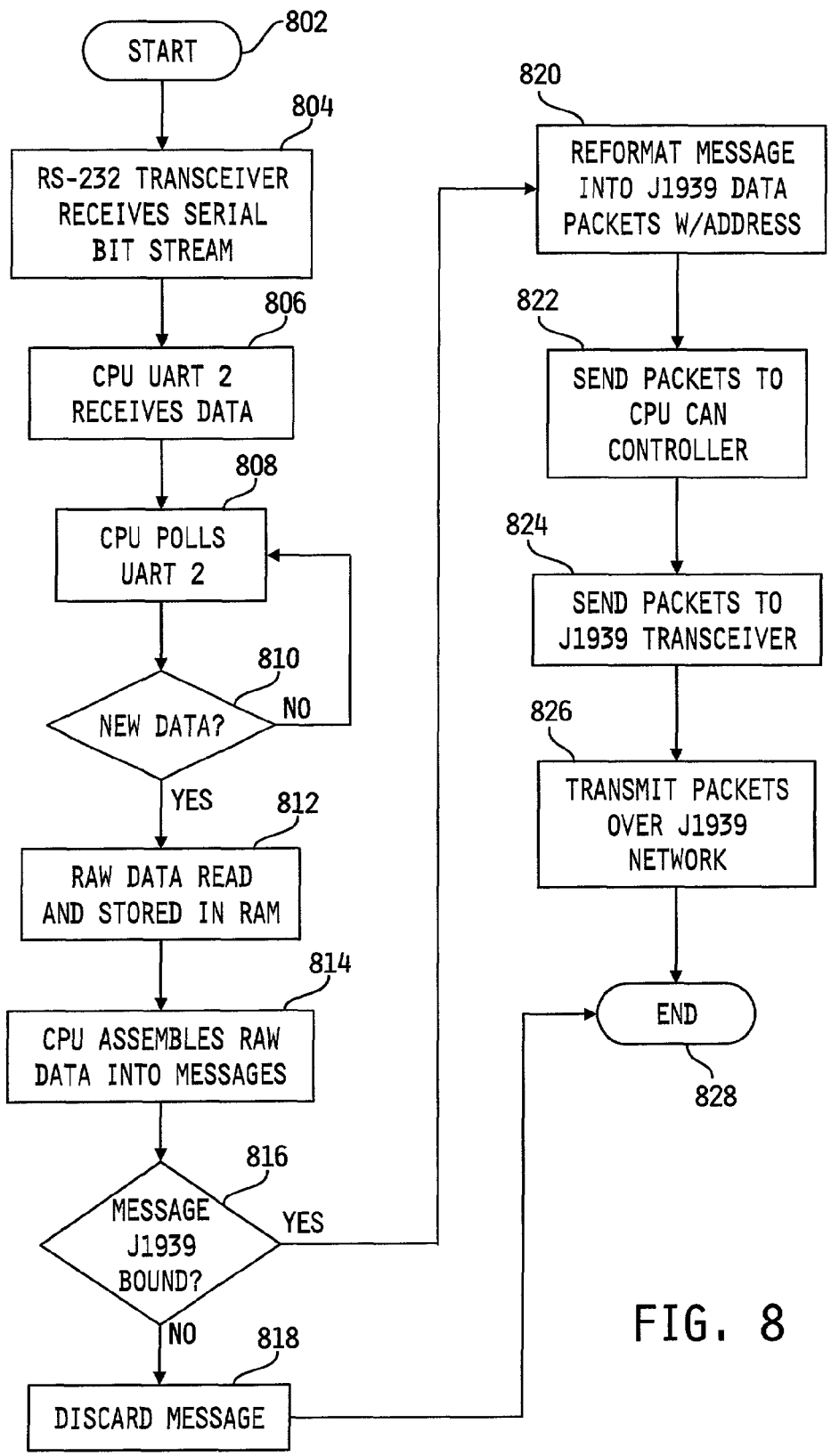
FIG. 8 is a flowchart illustrating one embodiment of an algorithm for transferring messages between a vehicle communications network and a computer, in accordance with the present invention.

Turning to FIG. 8, a flow chart that illustrates one preferred embodiment of an algorithm to implement the optional RS-232 to J1939 interface is shown. The algorithm begins at step 802. In step 804, serial information from the serial device coupled to RS-232 transceiver 218 enters transceiver 218 on line RXD as a serial bit stream, and in step 806 is immediately transferred to the UART associated with the Serial 2 interface of CPU 204. The UART converts the serial bit stream to bytes, and stores the bytes in a buffer. In steps 808-810, CPU 204 polls the UART in a continuous polling cycle. During each cycle, in step 812 any new bytes are read and stored in a RAM associated with CPU 204. Alternatively, CPU 204 may respond to an interrupt generated when data is received by the UART.

In step 814, CPU 204 assembles the bytes into messages, and in step 816 it determines if a message is addressed to a J1939 node of vehicle communications network 108. If not, then in step 818 the message is discarded. Otherwise, in step 820 CPU 204 reformats the message as one or more properly addressed J1939 data packets. In step 822, the J1939 data packets are sent to the CAN controller of CPU 204. In step 824, the J1939 data packets are sent to J1939 transceiver 214. In step 826, transceiver 214 communicates the data packets to the appropriate node of vehicle communications network 108, in accordance with the address of the data packet. At step 828, the algorithm ends, and returns to "Start" step 802.

Figure 9:
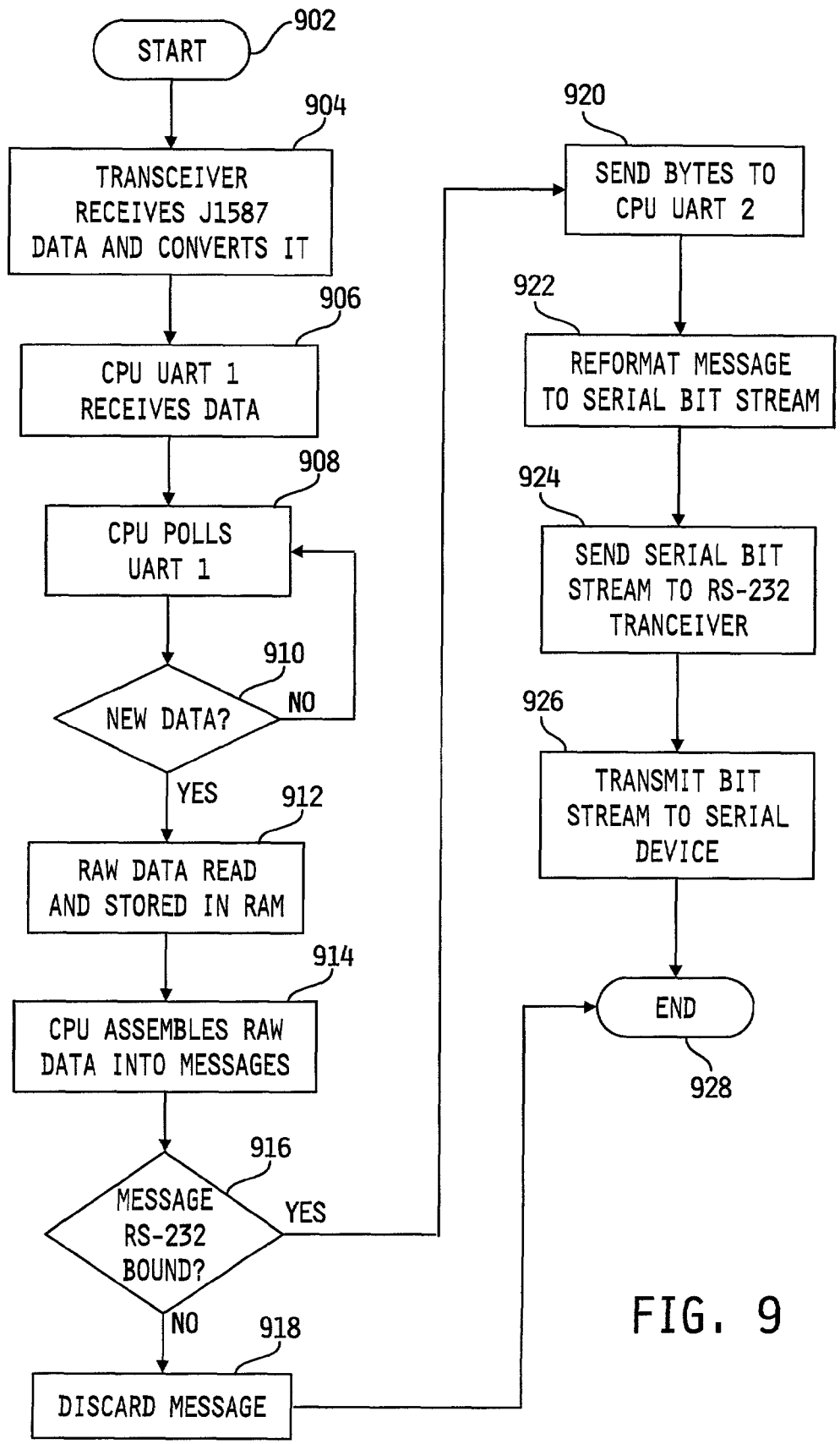
FIG. 9 is a flowchart illustrating one embodiment of an algorithm for transferring messages between a vehicle communications network and a computer, in accordance with the present invention.

Turning to FIG. 9, a flow chart that illustrates one preferred embodiment of an algorithm to implement the optional J1587 to RS-232 interface is shown. The algorithm begins at step 902. In step 904, serial information from the J1587 portion of vehicle communications network 108 containing network messages first enters J1587 transceiver 216 over lines J1587+ and J1587− thereof. Transceiver 216 converts the data signal as required for it to be read by the UART associated with the Serial 1 interface of CPU 204. In step 906, the data signal is received by the UART associated with the Serial 1 interface of CPU 204. In steps 908-910, CPU 204 polls the UART in a continuous polling cycle. During each cycle, in step 912 any new raw data is read and stored in a RAM associated with CPU 204. Alternatively, CPU 204 may respond to an interrupt generated when data is received by the UART.

In step 914, CPU 204 assembles the raw data into messages, and in step 916 it determines if a message is bound for a serial device coupled to RS-232 transceiver 218. If not, then in step 918 the message is discarded. Otherwise, in step 920 the bytes of the message are sent to the UART associated with the Serial 2 interface of CPU 204. In step 922, the UART reformats the message into a serial bit stream. In step 924, the serial bit stream is sent from the UART associated with the Serial 2 interface of CPU 204 to RS-232 transceiver 218. In step 926, transceiver 218 transmits the serial bit stream to the serial device coupled thereto via the TXD line of transceiver 218. At step 928, the algorithm ends, and returns to "Start" step 902.

Figure 10:
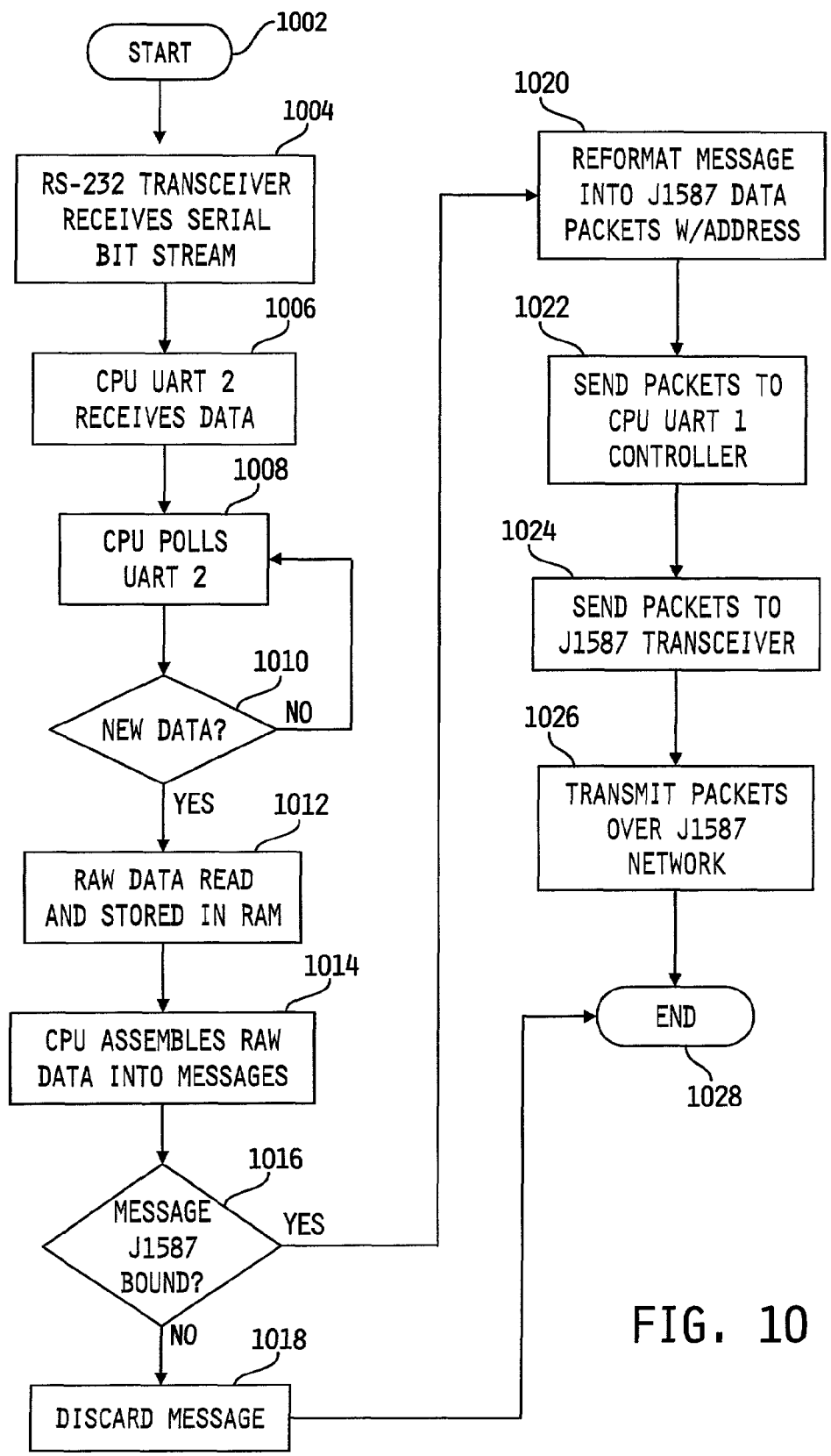
FIG. 10 is a flowchart illustrating one embodiment of an algorithm for transferring messages between a vehicle communications network and a computer, in accordance with the present invention.

Turning to FIG. 10, a flow chart that illustrates one preferred embodiment of an algorithm to implement the optional RS-232 to J1587 interface is shown. The algorithm begins at step 1002. In step 1004, serial information from the serial device coupled to RS-232 transceiver 218 enters transceiver 218 as a serial bit stream, and in step 1006 is immediately transferred to the UART associated with the Serial 2 interface of CPU 204. The UART converts the serial bit stream to bytes, and stores the bytes in a buffer. In steps 1008-1010, CPU 204 polls the UART in a continuous polling cycle. During each cycle, in step 1012 any new bytes are read and stored in a RAM associated with CPU 204. Alternatively, CPU 204 may respond to an interrupt generated when data is received by the UART.

In step 1014, CPU 204 assembles the bytes into messages, and in step 1016 it determines if a message is addressed to a J1587 node of vehicle communications network 108. If not, then in step 1018 the message is discarded. Otherwise, in step 1020 CPU 204 reformats the message as one or more properly addressed J1587 data packets. In step 1022, the J1587 data packets are sent to the UART associated with the Serial 1 interface of CPU 204. In step 1024, the J1587 data packets are sent to J1587 transceiver 216. In step 1026, transceiver 216 communicates the data packets to the appropriate node of vehicle communications network 108 via the J1587+ and J1587− lines coupled thereto, in accordance with the address of the data packet. At step 1028, the algorithm ends, and returns to "Start" step 1002.

Other embodiments of the present invention may also be implemented without departing from the scope of the claimed invention. For example, in one illustrative embodiment it may be desirable to include in USB adapter 200 capability for downloading the updated calibration software from a remote computer to a vehicle subsystem computer. For further example, this disclosure primarily discusses engine control computers. However, in other illustrative embodiments USB adapter 200 may be used to interface remote computers to other vehicle subsystems, such as applications involving transmissions, anti-lock braking systems, vehicle management computers, and the like.

In the disclosure above, it is noted that PCs generally run vehicle diagnostic software while PDAs generally run service tool software. However, this is not necessarily the case, and nothing in this disclosure should be read to limit the software which may be executed by any remote computer coupled to a vehicle communications network in accordance with the present invention. Furthermore, almost any computer having the necessary communications capabilities may be coupled to vehicle communications network 108 via USB adapter 200, and nothing in this disclosure should be construed as implying otherwise.

The illustrative embodiments described herein are exemplary, and are not intended to limit the claimed invention in any way. Although certain applications are described as specifically well suited for use with the current invention, it is believed to be useful in other applications as well. In fact, there are few, if any, internal combustion engine applications in which the present invention would not offer some benefit. Engine and engine controller manufacturers may choose to include the present invention in all engines, irrespective of the application.

What is claimed is:

1. An adapter for allowing communications between a vehicle control computer coupled to a vehicle communications network and a remote computer, the adapter comprising:
    a first interface configured for operatively coupling to a first network segment of the vehicle communications network, the first network segment configured for communications according to a first protocol;
    a second interface configured for operatively coupling to a second network segment of the vehicle communications network, the second network segment configured for communications according to a second protocol; and
    a third interface including a universal serial bus (USB) controller having a USB device port and a USB host port, the third interface configured for operatively coupling to the remote computer via at least one of the USB device port and the USB host port;
    wherein the vehicle control computer and the remote computer communicate via one of the first network segment through the first and third interfaces and the second network segment through the second and third interfaces.

2. The adapter of claim 1, wherein the remote computer is a personal digital assistant having a USB device port, and wherein the USB device port of the personal digital assistant is operatively coupled to the USB host port of the universal serial bus controller.

3. The adapter of claim 2, wherein the remote computer comprises service tool software.

4. The adapter of claim 2, wherein the remote computer comprises vehicle diagnostic software.

5. The adapter of claim 1, wherein the remote computer is a personal computer having a USB host port, and wherein the USB host port of the personal computer is operatively coupled to the USB device port of the universal serial bus controller.

6. The adapter of claim 5, wherein the remote computer comprises service tool software.

7. The adapter of claim 5, wherein the remote computer comprises vehicle diagnostic software.

8. The adapter of claim 1, wherein the USB host port of the universal serial bus controller is configured for coupling with a plurality of remote computers, each of the plurality of remote computers having a USB device port.

9. The adapter of claim 8, wherein at least one of the plurality of remote computers comprises vehicle diagnostic or service tool software.

10. The adapter of claim 1, wherein the first network segment of the vehicle communications network comprises a J1939 network segment, and wherein the first interface of the adapter is operatively coupled to the J1939 network segment.

11. The adapter of claim 10, wherein messages communicated via the J1939 network segment are made available via the third interface.

12. The adapter of claim 11, wherein the remote computer is a personal digital assistant having a USB device port, the USB device port of the personal digital assistant is operatively coupled to the USB host port of the universal serial bus controller, and messages communicated via the J1939 network segment are further communicated to the personal digital assistant.

13. The adapter of claim 11, wherein the remote computer is a personal computer having a USB host port, the USB host port of the personal computer is operatively coupled to the USB device port of the universal serial bus controller, and messages communicated via the J1939 network segment are further communicated to the personal computer.

14. The adapter of claim 1, wherein the first network segment of the vehicle communications network comprises a J1587 network segment, and wherein the first interface of the adapter is operatively coupled to the J1587 network segment.

15. The adapter of claim 14, wherein messages communicated via the J1587 network segment are made available via the third interface.

16. The adapter of claim 15, wherein the remote computer is a personal digital assistant having a USB device port, the USB device port of the personal digital assistant is operatively coupled to the USB host port of the universal serial bus controller, and messages communicated via the J1587 network segment are further communicated to the personal digital assistant.

17. The adapter of claim 15, wherein the remote computer is a personal computer having a USB host port, the USB host port of the personal computer is operatively coupled to the USB device port of the universal serial bus controller, and messages communicated via the J1587 network segment are further communicated to the personal computer.

18. The adapter of claim 1, the adapter further comprising a fourth interface configured for operatively coupling to a second remote computer, wherein the fourth interface comprises an RS-232 serial port.

19. The adapter of claim 18, wherein the second remote computer is a personal digital assistant having an RS-232 serial port, and wherein the RS-232 serial port of the personal digital assistant is operatively coupled to the RS-232 serial port of the adapter.

20. The adapter of claim 19, wherein the second remote computer comprises service tool software.

21. The adapter of claim 19, wherein the second remote computer comprises vehicle diagnostic software.

22. The adapter of claim 18, wherein the second remote computer is a personal computer having an RS-232 serial port, and wherein the RS-232 serial port of the personal computer is operatively coupled to the RS-232 serial port of the adapter.

23. The adapter of claim 22, wherein the second remote computer comprises service tool software.

24. The adapter of claim 22, wherein the second remote computer comprises vehicle diagnostic software.

25. The adapter of claim 1, wherein the universal serial bus controller further comprises a USB On-The-Go port.

26. The adapter of claim 25, wherein the remote computer is a personal digital assistant having a USB device port, and wherein the USB device port of the personal digital assistant is operatively coupled to the USB On-The-Go port of the universal serial bus controller.

27. The adapter of claim 25, wherein the remote computer is a personal computer having a USB host port, and wherein the USB host port of the personal computer is operatively coupled to the USB On-The-Go port of the universal serial bus controller.

28. An adapter for allowing communications between a vehicle control computer coupled to a J1939 network of a vehicle and a remote computer, the adapter comprising:
   a first interface configured for operatively coupling to a J1939 network of a vehicle;
   a second interface configured for operatively coupling to a second network of the vehicle, the second network configured for communications according to a protocol different from the J1939 network; and
   a third interface including a universal serial bus (USB) controller having a USB device port and a USB host port, the third interface configured for operatively coupling to the remote computer via at least one of the USB device port and the USB host port;
   wherein the vehicle control computer and the remote computer communicate via one of the J1939 network through the first and third interfaces and the second network through the second and third interfaces.

29. The adapter of claim 28, wherein the remote computer is a personal digital assistant having a USB device port, and wherein the USB device port of the personal digital assistant is operatively coupled to the USB host port of the universal serial bus controller.

30. The adapter of claim 28, wherein the remote computer is a personal computer having a USB host port, and wherein the USB host port of the personal computer is operatively coupled to the USB device port of the universal serial bus controller.

31. The adapter of claim 28, wherein the USB host port of the universal serial bus controller is configured for coupling with a plurality of remote computers, each of the plurality of remote computers having a USB device port.

32. The adapter of claim 28, the adapter further comprising a fourth interface configured for operatively coupling to a second remote computer, wherein the fourth interface comprises an RS-232 serial port.

33. The adapter of claim 28, wherein the universal serial bus controller further comprises a USB On-The-Go port.

34. The adapter of claim 33, wherein the remote computer is a personal digital assistant having a USB device port, and wherein the USB device port of the personal digital assistant is operatively coupled to the USB On-The-Go port of the universal serial bus controller.

35. The adapter of claim 33, wherein the remote computer is a personal computer having a USB host port, and wherein the USB host port of the personal computer is operatively coupled to the USB On-The-Go port of the universal serial bus controller.

36. An adapter for allowing communications between a vehicle control computer coupled to a J1587 network of a vehicle and a remote computer, the adapter comprising:
   a first interface configured for operatively coupling to the J1587 network of a vehicle;
   a second interface configured for operatively coupling to a second network of the vehicle, the second network configured for communications according to a protocol different from the J1587 network; and
   a third interface including a universal serial bus (USB) controller having a USB device port and a USB host port, the third interface configured for operatively coupling to the remote computer via at least one of the USB device port and the USB host port;
   wherein the vehicle control computer and the remote computer communicate via one of the J1587 network through the first and third interfaces and the second network through the second and third interfaces.

37. The adapter of claim 36, wherein the remote computer is a personal digital assistant having a USB device port, and wherein the USB device port of the personal digital assistant is operatively coupled to the USB host port of the universal serial bus controller.

38. The adapter of claim 36, wherein the remote computer is a personal computer having a USB host port, and wherein the USB host port of the personal computer is operatively coupled to the USB device port of the universal serial bus controller.

39. The adapter of claim 36, wherein the USB host port of the universal serial bus controller is configured for coupling with a plurality of remote computers, each of the plurality of remote computers having a USB device port.

40. The adapter of claim 36, the adapter further comprising a fourth interface configured for operatively coupling to a second remote computer, wherein the fourth interface comprises an RS-232 serial port.

41. The adapter of claim 36, wherein the universal serial bus controller further comprises a USB On-The-Go port.

42. The adapter of claim 41, wherein the remote computer is a personal digital assistant having a USB device port, and wherein the USB device port of the personal digital assistant is operatively coupled to the USB On-The-Go port of the universal serial bus controller.

43. The adapter of claim 41, wherein the remote computer is a personal computer having a USB host port, and wherein the USB host port of the personal computer is operatively coupled to the USB On-The-Go port of the universal serial bus controller.

44. An adapter for allowing communications between control computers of a vehicle and a remote computer, the adapter comprising:
- a first interface configured for operatively coupling to a J1939 network segment of the vehicle;
- a second interface configured for operatively coupling to a J1587 network segment of the vehicle; and
- a third interface including a universal serial bus (USB) controller having a USB device port and a USB host port, the third interface configured for operatively coupling to the remote computer via at least one of the USB device port and the USB host port;
- wherein at least one control computer of the vehicle and the remote computer communicate via the J1939 network through the first and third interfaces and at least another control computer of the vehicle and the remote computer communicate via the J1587 network through the second and third interfaces.

45. The adapter of claim 44, wherein the remote computer is a personal digital assistant having a USB device port, and wherein the USB device port of the personal digital assistant is operatively coupled to the USB host port of the universal serial bus controller.

46. The adapter of claim 44, wherein the remote computer is a personal computer having a USB host port, and wherein the USB host port of the personal computer is operatively coupled to the USB device port of the universal serial bus controller.

47. The adapter of claim 44, wherein the USB host port of the universal serial bus controller is configured for coupling with a plurality of remote computers, each of the plurality of remote computers having a USB device port.

48. The adapter of claim 44, wherein the universal serial bus controller further comprises a USB On-The-Go port.

49. The adapter of claim 48, wherein the remote computer is a personal digital assistant having a USB device port, and wherein the USB device port of the personal digital assistant is operatively coupled to the USB On-The-Go port of the universal serial bus controller.

50. The adapter of claim 48, wherein the remote computer is a personal computer having a USB host port, and wherein the USB host port of the personal computer is operatively coupled to the USB On-The-Go port of the universal serial bus controller.

51. A method for allowing communications between a vehicle control computer operatively coupled to a communication network of a vehicle and a remote computer, the method comprising:
- receiving a datum via one of a first interface and a second interface, the first interface operatively coupled to a first network segment of the vehicle and configured for communication according to a first protocol, the second interface operatively coupled to a second network segment of the vehicle and configured for communication according to a second protocol;
- transmitting the datum via a third interface, the third interface including a universal serial bus controller having a USB device port and a USB host port, the third interface configured for operatively coupling to a remote computer via at least one of the USB device port and the USB host port;
- wherein the datum is received from the vehicle control computer operatively coupled to one of the first network segment and the second network segment, and wherein the datum is transmitted to the remote computer.

52. The method of claim 51, wherein the datum is a network message, the network message comprising a destination address.

53. The method of claim 52, wherein the transmitting step comprises determining whether the network message is bound for the third interface, and transmitting the network message via the third interface only if the network message is bound for the third interface.

54. The method of claim 53, wherein determining whether the network message is bound for the third interface comprises reading the address and comparing it to an existing address.

55. The method of claim 52 wherein the transmitting step comprises transmitting the network message via the third interface irrespective of the destination address of the network message.

56. An adapter for allowing communications between a vehicle control computer operatively coupled to a vehicle communications network, the adapter comprising:
- a first interface configured for operatively coupling to a first network segment of the vehicle communications network, the first network segment configured for communications according to a first protocol;
- a second interface configured for operatively coupling to a second network segment of the vehicle communications network, the second network segment configured for communications according to a second protocol; and
- a third interface including a USB On-The-Go port, the third interface configured for operatively coupling to the remote computer via the USB On-The-Go port;
- wherein the vehicle control computer and the remote computer communicate via one of the first network segment through the first and third interfaces and the second network segment through the second and third interfaces.

57. The adapter of claim 56, wherein the remote computer is a personal digital assistant having a USB device port, and wherein the USB device port of the personal digital assistant is operatively coupled to the USB On-The-Go port of the adapter.

58. The adapter of claim 57, wherein the remote computer comprises service tool software.

59. The adapter of claim 57, wherein the remote computer comprises vehicle diagnostic software.

60. The adapter of claim 56, wherein the remote computer is a personal computer having a USB host port, and wherein the USB host port of the personal computer is operatively coupled to the USB On-The-Go port of the adapter.

61. The adapter of claim 60, wherein the remote computer comprises service tool software.

62. The adapter of claim 60, wherein the remote computer comprises vehicle diagnostic software.

63. The adapter of claim 56, wherein the first network segment of the vehicle communications network comprises a J1939 network segment, and wherein the first interface of the adapter is operatively coupled to the J1939 network segment.

64. The adapter of claim 63, wherein messages communicated via the J1939 network segment are made available via the second interface.

65. The adapter of claim 64, wherein the remote computer is a personal digital assistant having a USB device port, the USB device port of the personal digital assistant is operatively coupled to the USB On-The-Go port of the adapter, and messages communicated via the J1939 network segment are further communicated to the personal digital assistant.

66. The adapter of claim 64, wherein the remote computer is a personal computer having a USB host port, the USB host port of the personal computer is operatively coupled to the USB On-The-Go port of the adapter, and messages communicated via the J1939 network segment are further communicated to the personal computer.

67. The adapter of claim 56, wherein the first network segment of the vehicle communications network comprises a J1587 network segment, and wherein the first interface of the adapter is operatively coupled to the J1587 network segment.

68. The adapter of claim 67, wherein messages communicated via the J1587 network segment are made available via the second interface.

69. The adapter of claim 68, wherein the remote computer is a personal digital assistant having a USB device port, the USB device port of the personal digital assistant is operatively coupled to the USB On-The-Go port of the adapter, and messages communicated via the J1587 network segment are further communicated to the personal digital assistant.

70. The adapter of claim 68, wherein the remote computer is a personal computer having a USB host port, the USB host port of the personal computer is operatively coupled to the USB On-The-Go port of the adapter, and messages communicated via the J1587 network segment are further communicated to the personal computer.

71. The adapter of claim 56, the adapter further comprising a fourth interface configured for operatively coupling to a second remote computer, wherein the fourth interface comprises an RS-232 serial port.

72. The adapter of claim 71, wherein the second remote computer is a personal digital assistant having an RS-232 serial port, and wherein the RS-232 serial port of the personal digital assistant is operatively coupled to the RS-232 serial port of the adapter.

73. The adapter of claim 72, wherein the second remote computer comprises service tool software.

74. The adapter of claim 72, wherein the second remote computer vehicle comprises vehicle diagnostic software.

75. The adapter of claim 71, wherein the second remote computer is a personal computer having an RS-232 serial port, and wherein the RS-232 serial port of the personal computer is operatively coupled to the RS-232 serial port of the adapter.

76. The adapter of claim 75, wherein the second remote computer comprises service tool software.

77. The adapter of claim 75, wherein the second remote computer vehicle comprises vehicle diagnostic software.

78. An adapter for allowing communications between control computers of a vehicle and a remote computer, the adapter comprising:
a first interface configured for operatively coupling to a J1939 network segment of the vehicle;
a second interface configured for operatively coupling to a J1587 network segment of the vehicle; and
a third interface including a USB On-The-Go port, the third interface configured for operatively coupling to the remote computer via the USB On-The-Go port;
wherein at least one control computer of the vehicle and the remote computer communicate via J1939 network segment through the first and third interfaces and at least another control computer of the vehicle and the remote computer communicate via the J1587 network segment through the second and third interfaces.

79. The adapter of claim 78, wherein the remote computer is a personal digital assistant or personal computer having a USB On-The-Go port, and wherein the USB On-The-Go port of the remote computer is operatively coupled to the USB On-The-Go port of the adapter.

80. The adapter of claim 79, wherein the remote computer comprises service tool software.

81. The adapter of claim 79, wherein the remote computer comprises vehicle diagnostic software.

82. The adapter of claim 78, wherein the remote computer is a personal digital assistant having a USB device port, and wherein the USB device port of the personal digital assistant is operatively coupled to the USB On-The-Go port of the adapter.

83. The adapter of claim 82, wherein the remote computer comprises service tool software.

84. The adapter of claim 82, wherein the remote computer comprises vehicle diagnostic software.

85. The adapter of claim 78, wherein the remote computer is a personal computer having a USB host port, and wherein the USB host port of the personal computer is operatively coupled to the USB On-The-Go port of the adapter.

86. The adapter of claim 85, wherein the remote computer comprises service tool software.

87. The adapter of claim 85, wherein the remote computer comprises vehicle diagnostic software.

88. The adapter of claim 78, the adapter further comprising a fourth interface configured for operatively coupling to a second remote computer, wherein the fourth interface comprises an RS-232 serial port.

89. The adapter of claim 88, wherein the second remote computer is a personal digital assistant having an RS-232 serial port, and wherein the RS-232 serial port of the personal digital assistant is operatively coupled to the RS-232 serial port of the adapter.

90. The adapter of claim 89, wherein the second remote computer comprises service tool software.

91. The adapter of claim 89, wherein the second remote computer comprises vehicle diagnostic software.

92. The adapter of claim 88, wherein the second remote computer is a personal computer having an RS-232 serial port, and wherein the RS-232 serial port of the personal computer is operatively coupled to the RS-232 serial port of the adapter.

93. The adapter of claim 92, wherein the second remote computer comprises service tool software.

94. The adapter of claim 92, wherein the second remote computer comprises vehicle diagnostic software.

95. The adapter of claim 88, wherein the remote computer is the second remote computer.

* * * * *